US005812427A

United States Patent [19]

Nonoyama et al.

[11] Patent Number: 5,812,427

[45] Date of Patent: Sep. 22, 1998

[54] PHYSICAL QUANTITY DETECTING APPARATUS

[75] Inventors: Shigeru Nonoyama, Aichi; Takamoto Watanabe, Nagoya, both of Japan

[73] Assignee: Nippondenso Co., Ltd., Kariya, Japan

[21] Appl. No.: 634,254

[22] Filed: Apr. 18, 1996

[30] Foreign Application Priority Data

Apr. 24, 1995 [JP] Japan .................................... 7-098846

[51] Int. Cl.[6] ............................ G01P 15/125; G01D 5/24

[52] U.S. Cl. .......................... 364/566; 364/148; 364/157; 324/166; 324/207.12; 324/76.55; 324/207.22

[58] Field of Search .................................... 364/560–563; 327/102, 3; 348/691, 695; 377/43; 250/574; 331/45, 60

[56] References Cited

U.S. PATENT DOCUMENTS

| | | | |
|---|---|---|---|
| 4,636,649 | 1/1987 | Kimura et al. | 250/574 |
| 5,095,750 | 3/1992 | Suzuki et al. | 73/514.26 |
| 5,128,624 | 7/1992 | Hoshino et al. | 328/133 |
| 5,166,542 | 11/1992 | Matsubara et al. | 307/261 |
| 5,283,474 | 2/1994 | Oi et al. | 307/116 |
| 5,341,218 | 8/1994 | Kaneko et al. | 348/695 |
| 5,345,824 | 9/1994 | Sherman et al. | 73/514.18 |
| 5,396,247 | 3/1995 | Watanabe et al. | 341/157 |
| 5,416,444 | 5/1995 | Yamauchi et al. | 331/45 |
| 5,428,352 | 6/1995 | Bennett | 324/661 |
| 5,440,501 | 8/1995 | Shimomura et al. | 364/560 |
| 5,465,076 | 11/1995 | Yamauchi et al. | 331/179 |
| 5,477,196 | 12/1995 | Yamauchi et al. | 331/60 |
| 5,506,454 | 4/1996 | Hanzawa et al. | 307/10.1 |
| 5,511,421 | 4/1996 | Kudo | 73/514.32 |
| 5,525,899 | 6/1996 | Watanabe et al. | 324/166 |
| 5,541,437 | 7/1996 | Watanabe et al. | 257/417 |
| 5,568,071 | 10/1996 | Hoshino et al. | 377/43 |

FOREIGN PATENT DOCUMENTS

| | | |
|---|---|---|
| 64-013419 | 1/1989 | Japan . |
| 3-085014 | 4/1991 | Japan . |
| 6-229777 | 8/1994 | Japan . |

OTHER PUBLICATIONS

Spangler et al: "ISAAC—Integrated Silicon Automotive Accelerometer",Transducers'95–Eurosensors IX, The 8th International Conference on Solid-state Sensors and Actuators, and Eurosensors IX, Stockholm,Sweden Jun. 25–29, 1995 pp. 585–588.

Smith et al: "A 15b Electromechanical Sigma–Delta Converter for Acceleration Measurements", IEEE ISSCC 94 Digest of Technical Papers, 1994, pp. 160–161.

Lu et al: "A Monolithic Surface Micromachined Accelerometer with Digital Output", IEEE ISSCC 95 Digest of Technical Papers, 1995, pp. 160–161.

*Primary Examiner*—James P. Trammell
*Assistant Examiner*—Cuong H. Nguyen
*Attorney, Agent, or Firm*—Cushman Darby & Cushman, IP Group of Pillsbury Madison & Sutro LLP

[57] ABSTRACT

A physical amount detecting apparatus, preferably, an acceleration sensor, includes a sensor element, an A/D converter, a control unit and an activation unit. The sensor element is activated by a supply voltage and outputs an electric signal in accordance with a predetermined physical amount. The A/D converter digitizes an analog electric signal and outputs digital data. The control unit calculates a control amount in order to control the sensor element, as the electric signal is set to a predetermined output, based on the digital data, and generates a control signal in accordance with the control amount. The activation unit activates the sensor element in accordance with the control signal. As a result, the control unit outputs a detecting signal indicating a physical amount in accordance with the control amount or the control signal.

24 Claims, 14 Drawing Sheets

22
REGISTER
40
Db
42
CONTROL AMOUNT SETTING UNIT
26
CLOCK GENERATOR
38
ΔD0
44
CK0
CK1
REGISTER
36
46
REGISTER
D0
REGISTER
34
48
PWM CIRCUIT
24
LPF
V0
Da
A/D CONVERTER
20
PT
CK0
CK1
Vin
C2
16
10
14
12
V2
18
S12
V1
C1
Rb
Vb
VDD
Vb
S11

ACCELERATION
OG
C1=C2
C1>C2
C1=C2
BASIC CLOCK
CKO
POTENTIALS V1 & V2 OF CONTROL ELECTRODES 12 & 14
VDD
Vbias
V1
V2
POTENTIAL Vin OF CENTER ELECTRODE 10
Vbias
TIMING OF A/D CONVERSION
STATIC ELECTRIC FORCE APPLIED TO CENTER ELECTRODE 10
C1
C2

CKI
PT
CKr
TCP
DI
PO
CDH
CDL
m-1
m-2
o
m
(m)
(n)

ACCELERATION
BASIC CLOCK
POTENTIAL V1 OF CONTROL ELECTRODE 12
POTENTIAL V2 OF CONTROL ELECTRODE 14
POTENTIAL Vin OF CENTER ELECTRODE 10
TIMING OF A/D CONVERSION
STATIC ELECTRIC FORCE APPLIED TO CENTER ELECTRODE 10
OG
CKO
VDD
VH
VL
VSS
Vc
C1
C2
C1=C2
C1>C2
C1=C2

ACCELERATION
0G
C1=C2
C1>C2
C1=C2
BASIC CLOCK
CK0
POTENTIALS V1 & V2 OF CONTROL ELECTRODES 12 & 14
VDD
Vbias
V1
V2
VARIABLE
CONSTANT
POTENTIAL Vin OF CENTER ELECTRODE 10
Vbias
TIMING OF A/D CONVERSION
STATIC ELECTRIC FORCE APPLIED TO CENTER ELECTRODE 10
C1
C2

22
REGISTER
40
Db
42
CONTROL AMOUNT SETTING UNIT
26
CLOCK GENERATOR
38
ΔD0
44
CK0
CK1
CK2
46
REGISTER
36
REGISTER
D0
34
REGISTER
48
PWM CIRCUIT
24
LPF
V0
Da
20
A/D CONVERTER
PT2
PT1
CK0
CK1
Vin
C1
C2
16
10
14
12
V2
18
S12
VDD
Vb
V1
S30
CK2
S11

PHYSICAL QUANTITY DETECTING APPARATUS

BACKGROUND OF THE INVENTION

1. Field of the Invention

The present invention relates to a physical amount detecting apparatus for controlling a sensor element, which outputs an electric signal in accordance with a predetermined physical amount, so as to generate a predetermined output, and outputting a control amount as a detected output. The present invention is preferably utilized for an acceleration sensor.

2. Description of the Related Art

In a conventional art, there is the known physical quantity detecting apparatus including a sensor element which includes a movable portion having a beam structure on a semiconductor substrate, and, on the same substrate, further includes an acceleration sensor integrating a control circuit which controls the movable portion so as not to be displaced against the acceleration applied to the sensor element and which outputs a control signal as a detecting signal in accordance with the acceleration.

In the above acceleration sensor, in general, a movable electrode is provided on the movable portion of the sensor element, and fixed electrodes are provided on both sides of the movable electrode on the substrate. When the movable portion is displaced in response to action on the sensor element in response to the acceleration, the displacement of the movable portion can be detected in accordance with changes in the static capacitance of two variable capacitors which are formed by the movable electrode and each fixed electrode. Further, when the voltage is applied between the movable electrode and the fixed electrode, the position of the movable portion is controlled by a static electric force generated between the electrodes.

For a control circuit having the above sensor element, JPP-4-504003, for example, discloses a signal source supplying carrier waves, each having opposite phases, to each fixed electrode, and a demodulator demodulating a composite signal of two carrier waves existing at the center electrode and outputting a voltage signal in accordance with a difference of a static capacitance (i.e., a displacement amount of a movable portion). That is, the carrier waves supplied to each fixed electrode are modulated in phase in accordance with the static capacitance of a variable capacitance condenser which is formed between the center electrode and each fixed electrode, and are compounded in the movable electrode. Further, since the composite signal is modulated in phase and amplitude in accordance with the static capacitance of each condenser, a voltage signal is obtained in accordance with the difference of the static capacitance, i.e., the displacement of the movable portion by modulating the composite signal.

Further, in this apparatus, a positive bias voltage is supplied to one fixed electrode, a negative bias voltage is supplied to the other fixed electrode, and an output voltage of the demodulator is supplied to the movable electrode. Further, the potential difference between the movable electrode and each fixed electrode is changed based on change of the potential of the movable electrode in accordance with the output voltage, and the static electric force is controlled.

Further, JPP-1-253657 discloses a control circuit for a sensor element including a switched capacitor for detecting change of the static capacitance of one condenser in two variable capacitance condensers, which are formed between the movable electrode and each fixed electrode, and converting it to a voltage value; an integration circuit for integrating the voltage value which is input from the switched capacitor; and a PWM (pulse width modulation) circuit for outputting the output of the integration circuit to the detector and outputting a PWM signal having a predetermined amplitude and having a pulse width in accordance with the output of the integration circuit.

In the control circuit, the predetermined bias voltage is supplied to one fixed electrode, and the PWM signal from the PWM circuit is supplied to the other fixed electrode. The time of supplying the voltage between the movable electrode and the fixed electrode is controlled by the PWM signal so that the static electric force can be controlled between the electrodes.

There is, however, a problem in the above conventional art as follows. That is, since these control circuits are formed using an analog circuit which processes the detecting signal from the sensor element as an analog signal, when the sensor is integrally formed by placing the sensor element and the control circuit on the same substrate, the size of the sensor becomes large.

SUMMARY OF THE INVENTION

The primary object of the present invention is to provide a physical amount detecting apparatus enabling high integration and easy adjustment.

Another object of the present invention is to provide an acceleration sensor enabling high integration and easy adjustment.

In accordance with one aspect of the present invention, there is provided a physical amount detecting apparatus including: a sensor element activated by a supply voltage and outputting an electric signal in accordance with a predetermined physical amount; an analog-to-digital (A/D) converter for digitizing the electric signal and outputting digital data; a control unit for calculating a control amount in order to control the sensor element, as the electric signal is set to a predetermined output, based on the digital data, and generating a control signal in accordance with the control amount; and an activation unit for activating the sensor element in accordance with the control signal; wherein the control unit outputs a detecting signal indicating a physical amount in accordance with the control amount or the control signal.

According to the first aspect of the present invention, since the output of the sensor element is digitized by the A/D converter and all processes are performed based on digital data, it is possible to realize all structures by using digital circuits except for the sensor element. Further, since it is possible to realize a highly integrated circuit compared to an analog circuit, it is possible to miniaturize a size of the physical amount detecting apparatus when it is integrated on the same substrate.

Further, since the apparatus is realized by the digital circuits, it is possible to easily execute adjustment of offset and sensitivity based on digital calculations. As a result, since it is not necessary to provide a trimming adjustment of a thin film, which requires high cost and a lot of time, in an analog circuit, it is possible to realize easy adjustment of the circuits.

Still further, since the control amount is formed by the digital data and is output as the digital detection signal from the physical amount detecting apparatus, it is not necessary to digitize the detection signals again in a system so that it is possible to simplify the system structure.

In a preferred embodiment, the A/D converter includes: a pulse rotating circuit having an odd number of inversion circuits ring-connected to each other for inverting an input signal and outputting an inverted signal, an inversion operating time being changed in accordance with power voltage, one of the inversion circuits being formed as a start inversion circuit in which the inverting operation is controllable from an external stage, and for rotating a pulse signal therein in response to a start operation of the start inversion circuit; a counter connected to the pulse rotating circuit for counting the number of rotations of the pulse signal in the pulse rotating circuit, and outputting the counted result as binary digital data; a rotating position detecting unit for detecting the rotating position of the pulse signal in the pulse rotating circuit based on an inverted signal from each inversion circuit, and generating the binary digital data in accordance with the rotating position; and a detection controlling unit for operating the start inversion circuit and starting the rotational operation of the pulse rotating circuit, and for operating the rotating position detecting unit at a time after a predetermined elapsed time; wherein, the A/D converter sets either the electric signal from the sensor element, or another electric signal changing in accordance with the electric signal from the sensor element, to the power voltage for the pulse rotating circuit, and outputs digital data having plural bits consisting of lower bits and upper bits as the resultant data of the A/D conversion, the lower bits being the binary digital data from the rotating position detecting unit and the upper bits being the binary digital data from the counter.

In another preferred embodiment, the control unit includes: an oscillator having an odd number of inversion circuits ring-connected to each other, one of the inversion circuits being formed as a start inversion circuit which is controllable from an external stage, and for rotating the pulse signal when the start inversion circuit is started by an input signal and outputting oscillation pulses in a predetermined time interval; a count unit for counting an oscillation pulse from the oscillator and outputting the pulse signal when the count value is reached to the previously set value;

a programmable delay line including a plurality of delay stages cascade-connected to each other; the plurality of delay stages consisting of a basic path for passing the pulse signal from the count unit, a delay path being formed by a plurality of inversion circuits cascade-connected to each other and passing the pulse signal delayed by a predetermined delay time, and a selector for selecting either the basic path or the delay path as the path of the input signal in accordance with the digital data which are input from the external stage; wherein the programmable delay line outputs the delay signal which is delayed by the delay time, which is less than the time interval of the oscillation time from the oscillator;

a data control supplying unit for receiving digital control data having predetermined bits indicating the delay time of the input signal, setting upper bits of the digital control data as count values of the count unit, supplying lower bits of the digital control data to the programmable delay line, and setting the delay time of the programmable delay line; and an output unit for generating the input signal for a predetermined period to start the oscillator, stopping the oscillator when the delay signal is output from the programmable delay line, and generating a high level signal until the delay signal is output from the programmable delay line after the input signal is generated;

wherein the control unit further comprises a pulse width modulating circuit for setting the control amount to the digital control data and outputting the output signal having a pulse width in accordance with the control amount as the control signal, and controls the power supply time to the sensor element from the power supply means in accordance with a pulse width modulated signal which is output from the pulse width modulating circuit.

In still another preferred embodiment, the control unit comprises: a comparing unit for comparing the digital data with a predetermined reference data; and an up/down counter for increasing and decreasing the count value based on result of the comparing unit, and outputting the count value as the control amount; wherein the control means controls the power supply amount to the sensor element from the power supply means in accordance with the voltage based on the count value output by the up/down counter.

In still another preferred embodiment, the sensor element comprises: a movable portion formed so as to be able to displace a sensor element body; a center electrode provided for any one of the movable portion or the sensor element body; control electrodes each provided on both sides of the center electrode and opposite to each other in the vicinity of the center electrode; and a displacement detecting unit for outputting the electric signal in accordance with the displacement of the movable portion; wherein the output of the displacement detecting unit is input to the A/D converter, and the position of the movable portion is adjusted by a static electric force which is generated by a supply voltage between the center electrode and each control electrode; and the activation unit includes a pair of switches for supplying a predetermined drive voltage to two electrodes which are formed by the center electrode and each control electrode and alternately turned on/off in response to the pulse width modulating signal from the pulse width modulating circuit.

In still another preferred embodiment, the sensor element comprises: a movable portion formed so as to be able to displace a sensor element body; a center electrode provided for any one of the movable portion or the sensor element body; control electrodes each provided on both sides of the center electrode and opposite to each other in the vicinity of the center electrode; and a displacement detecting unit for outputting the electric signal in accordance with the displacement of the movable portion; wherein the output of the displacement detecting unit is input to the A/D converter, and the position of the movable portion is adjusted by a static electric force which is generated by a supply voltage between the center electrode and each control electrode;

the activation means comprises: a center voltage supply unit for supplying a potential which corresponds to the count value of the up/down counter, to the center electrode; and a control voltage supply unit for controlling the potential of each control electrode in such a way that the poles of the center electrode are different each other and the potential difference between the center electrode and each control electrode is increased or decreased periodically by the same value.

In still another preferred embodiment, the displacement detecting unit inputs the potential of the center electrode of the sensor element to the A/D converter as the electric signal indicating the movable portion.

In still another preferred embodiment, the displacement detecting unit includes a movable electrode which is formed by a movable electrode for displacement detection provided on the movable portion, and fixed electrodes for displacement detection provided both sides of the movable electrode on the substrate formed by an impurity diffusion layer; wherein the displacement of the movable portion is detected from the change in the current flowing between the movable electrode and each fixed electrode.

In accordance with another aspect of the present invention, there is provided an acceleration sensor including: a sensor element (16) activated by a supply voltage and outputting an electric signal in accordance with predetermined acceleration; an analog-to-digital (AD) converter (20) for digitizing the electric signal (Vin) which is output from the sensor element (16) and outputting digital data (Da); the control unit (34, 36, 38, 40, 42, 44, 46) for receiving the digital data (Da) from the A/D converter (20), calculating a control amount (ΔD0) to control the sensor element (16) as the electric signal (Vin) from the sensor element is set to a predetermined output, and outputting the control signal (D0) in accordance with the control amount (ΔD0); an activation unit for activating the sensor element (16) in accordance with the control signal (D0) from the control unit (34, 36, 38, 40, 42, 44, 46); and the A/D converter (20) comprising: a pulse running circuit (52) formed by a plurality of inversion circuits (INV) each of which inverts an input signal and outputs an inverted signal and the inverting time being changed by a power voltage, one of the inversion circuits (INV) being formed as a start inversion circuit in which an inverting operation is controllable from an external stage, and for running a pulse signal in accordance with start operation of the start inversion circuit; and the running position detecting unit (54, 56, 58, 60) for detecting a running position of the pulse signal within the pulse running circuit (52), and outputting binary digital data in accordance with the running position;

wherein the electric signal (Vin) from the sensor element (16) is used as the power voltage for each inversion circuit (INV) in the pulse running circuit (52), the binary digital data from the running position detecting unit (54, 56, 58, 60) is output as the digital data (Da), and the control amount (ΔD0) or the control signal (D0) is output as a signal indicating acceleration.

In accordance with still another aspect of the present invention, there is provided an acceleration sensor including: a sensor element (16) activated by supply voltage and outputting an electric signal in accordance with predetermined acceleration; an analog-to-digital (A/D) converter (20) for digitizing the electric signal (Vin) which is output from the sensor element (16) and outputting digital data (Da); the control unit (34, 36, 38, 40, 42, 44, 46) for receiving the digital data (Da) from the A/D converter (20), calculating a control amount (ΔD0) to control the sensor element (16) as the electric signal (Vin) from the sensor element is set to a predetermined output, and outputting the control signal (D0) in accordance with the control amount (ΔD0); an activation unit for activating the sensor element (16) in accordance with the control signal (D0) from the control unit (34, 36, 38, 40, 42, 44, 46); and the A/D converter (20) comprising: a pulse running circuit (52) formed by a plurality of inversion circuits (INV) each of which inverts an input signal and outputs an inverted signal and the inverting time being changed by a power voltage, one of the inversion circuits (INV) being formed by a start inversion circuit in which an inverting operation is controllable from an external stage, and for running a pulse signal in accordance with a start operation of the start inversion circuit; a running position detecting unit (54, 56, 58, 60) for detecting a running position of the pulse signal within the pulse running circuit (52), and outputting binary digital data in accordance with the running position; and a detection controlling unit (51) for starting the start inversion circuit and the inverting operation of the pulse running circuit (52), and operating the running position detecting unit (58, 60) after a predetermined time;

wherein the electric signal (Vin) from the sensor element (16) is used as the power voltage for each inversion circuit (INV) in the pulse running circuit (52), the binary digital data from the running position detecting unit (54, 56, 58, 60) is output as the digital data (Da), and the control amount (ΔD0) or the control signal (D0) is output as a detecting signal indicating acceleration.

In accordance with still another aspect of the present invention, there is provided an acceleration sensor including: a sensor element (16) including an element (32) having a first electrode (10), a second electrode (12) having a predetermined gap for the first electrode (10) and the gap being changed relatively for the first electrode (10) in accordance with an applied acceleration, a third electrode (14) provided across the first electrode (10) and opposite to the second electrode (12) and having another gap for the first electrode (10) which is changed relatively for the first electrode (10) in accordance with the applied acceleration, and the element (32) outputting an electric signal (Vin) in accordance with the acceleration;

an A/D converter for digitizing the electric signal (Vin) from the element (32) of the sensor element (16) and outputting digital data (Da); the control unit (34, 36, 38, 40, 42, 44, 46) for receiving the digital data (Da) from the A/D converter (20), calculating a control amount (ΔD0) to control the sensor element (16) as the electric signal (Vin) from the element (32) is set to a predetermined output, and outputting the control signal (D0) in accordance with the control amount (ΔD0);

a pulse generating unit (48) for receiving the control amount (D0) from the control unit (34, 36, 38, 40, 42, 44, 46), and outputting a control pulse signal (PT) having a pulse width in accordance with the control signal (D0); a switch unit (18) for receiving the control pulse signal (PT) from the pulse generating means (48), and passing electronic charges to or from the second electrode (12) and the third electrode (14) in accordance with a predetermined pattern and a pulse width of the control pulse signal (PT); and the A/D converter (20) comprising: a pulse rotating circuit (52) for ed by a plurality of inversion circuits (INV) each of which inverts an input signal and outputs an inverted signal and an inverting time being changed by a power voltage one of the inversion circuits (INV) being formed by a start inversion circuit in which an inverting operation is controllable from an external stage, and for rotating a pulse signal in accordance with start operation of the start inversion circuit; a counter (54, 56 ) for counting the number of rotations of the pulse signal within the pulse rotating circuit (52), and outputting the result as binary digital data; a rotating position detecting unit (58, 60) for detecting the rotating position of the pulse signal within the pulse rotating circuit (52) based on the output signal from each i version circuit (INV) in the inversion circuits (INV), and outputting the binary digital data in accordance with the rotating position; and detection a controlling unit (51) for starting the start inversion circuit and inverting operation of the pulse rotating circuit (52), and operating the rotating position detecting means (58, 60) after a predetermined time;

wherein the electric signal (Vin) from the sensor element (16) of the element (32) is used as the power voltage for each inversion circuit (INV) in the pulse running circuit (52), the binary digital data from the counter (54, 56) and the binary digital data from the rotating position detecting unit (58, 60) are output as the digital data (Da), an the control amount (ΔDo) or the control signal (Do) is output as a signal indicating acceleration.

DESCRIPTION OF THE PREFERRED EMBODIMENTS

Figure 1:
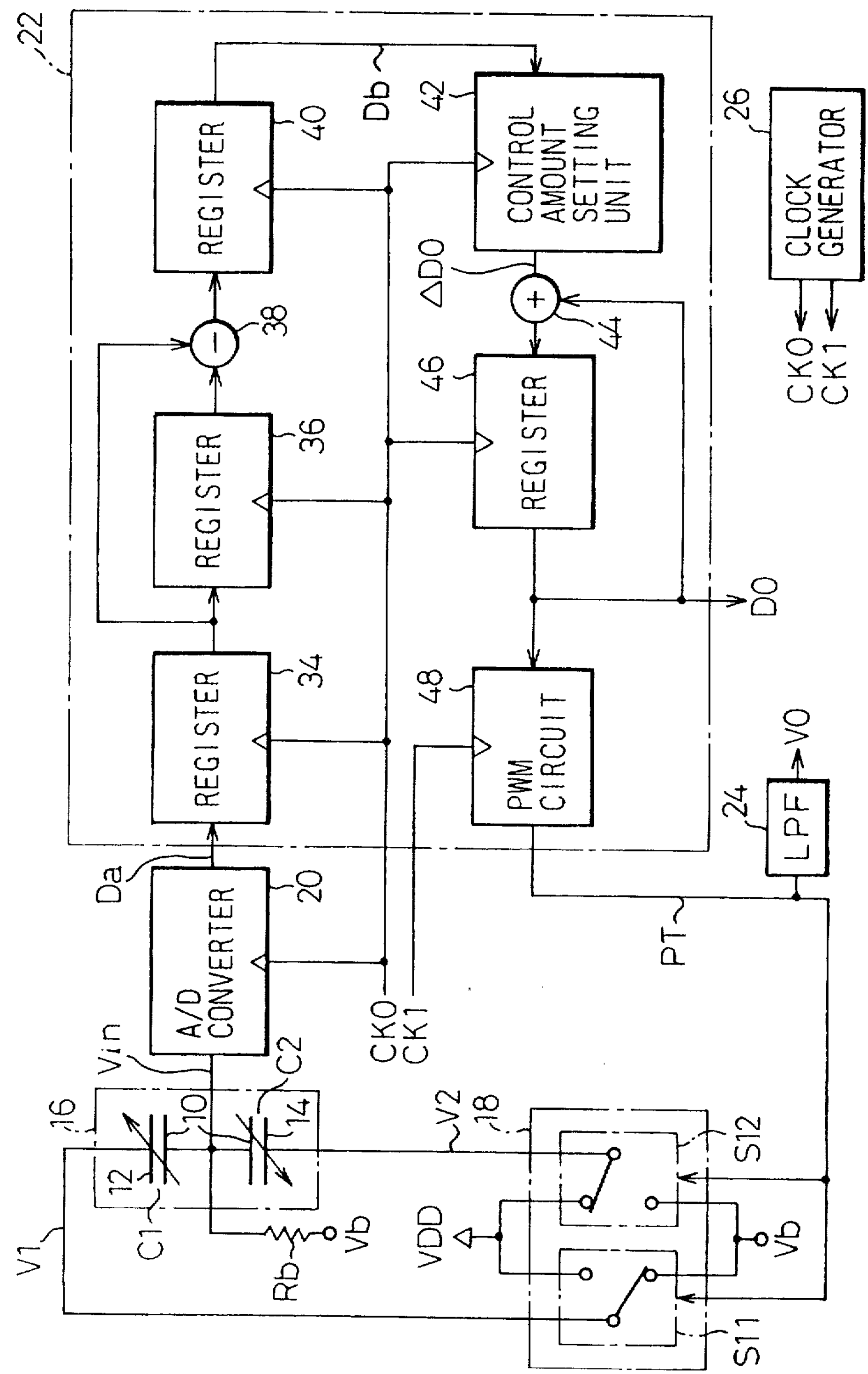
FIG. 1 is a block diagram of an acceleration sensor according to the first embodiment of the present invention.

FIG. 1 is a block diagram of an acceleration sensor according to the first embodiment of the present invention.

As shown in FIG. 1, the acceleration sensor in this embodiment is formed by a sensor element 16, an analog-to-digital converter (A/D) 20, a switch circuit 18, a control circuit 22, a low-pass filter 24, and a clock oscillator 26

The sensor element 16 includes a differential capacitance condenser which is formed by first and second condensers C1 and C2. The first condenser C1 is formed by a first displaceable center electrode 10 and a first control electrode 12. The second condenser C2 is formed by a second displaceable enter electrode 10 and a second control electrode 14.

The A/D converter 20 converts analog voltage Vin, which indicates a voltage of the center electrode 10, to digital data Da.

The control circuit 22 includes registers 34, 36, 40 and 46, a subtracter 38, control amount setting unit 42, an adder 44 and pulse width modulation (PWM) circuit 48. This circuit 22 generates a PWM signal PT based on the digital data Da.

The switch circuit 18 includes a first switch S11 and a second switch S12 both receiving the PWM signal PT from the control circuit 22, and outputs control voltages V1 and V2 to the first and second control electrodes 12 and 14.

The low-pass filter (LPF) 24 generates an analog detection signal V0 in accordance with a duty ratio of the PWM signal PT from the control circuit 22.

The clock oscillator 26 generates reference clocks CK0 to operate the A/D converter 20 and the control circuit 22, and dividing locks CK1 divided from the reference clocks CK0.

Further, Vb denotes bias voltage supplied to the center electrodes 10 through a current limiting resistance Rb.

Figure 2:
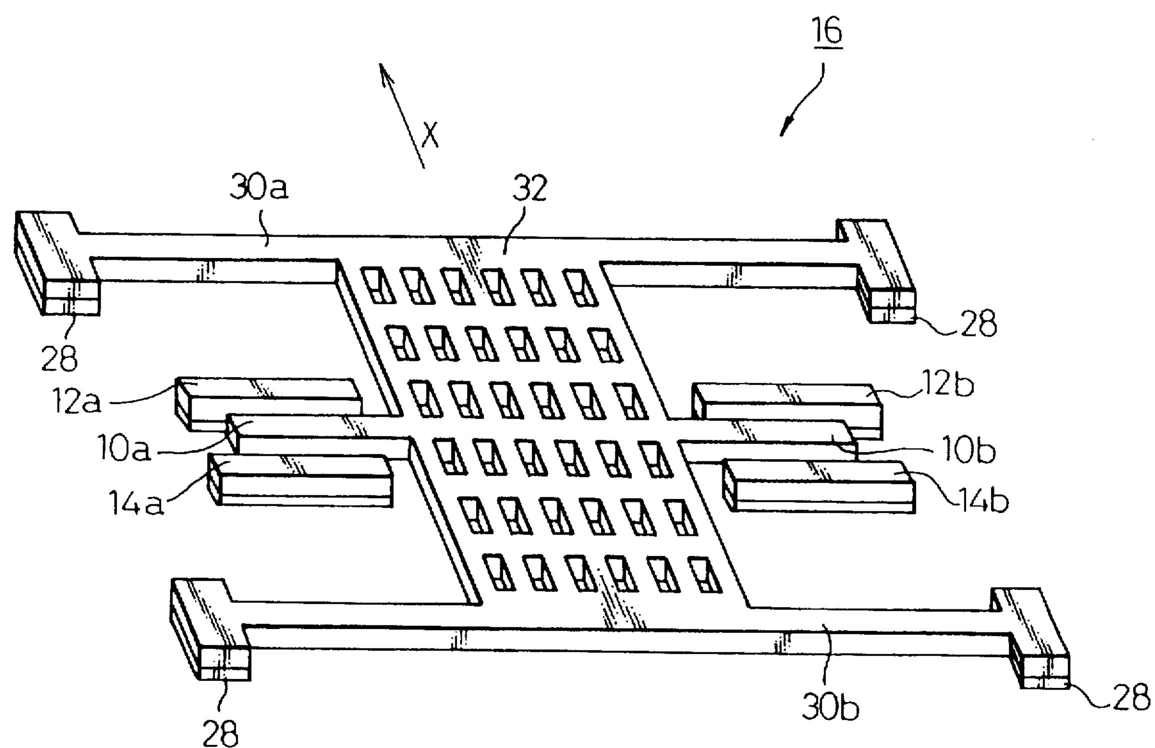
FIG. 2 is a perspective view of a sensor element shown in FIG. 1.

FIG. 2 is a perspective view of the sensor element shown in FIG. 1. As shown in FIG. 2, the sensor element 16 is formed by a air of bar-like beams 30*a* and 30*b* provided in parallel each other, and both ends of each beam 30*a* and 30*b* being fixed to a silicon substrate through an insulation film 28; a mass portion 32 having lattice-like structure an bridging the beams 30*a* and 30*b*; center electrodes 10*a* and 10*b* each projected in parallel to both beams from the center of the mass portion 32, and the center electrode 10*a* being provided to one side of the mass portion 32 and the center electrode 10*b* being provided to the other side thereof; and control electrodes 12*a*, 12*b*, 14*a* and 14*b* provided on both sides of the center electrodes 10 on the silicon substrate, control electrodes 12*a* and 14*a* being provided on both sides of the center electrode 10*a* and control electrodes 12*b* and 14*b* being provided on both sides of the center electrode 10*b*.

In the above structure, beams 30*a* and 30*b*, the mass portion 32, and center electrodes 10*a* and 10*b* are called the movable portion or sensor element 16. Further, the center electrodes 10*a* and 10*b* are connected with each other (accordingly, these are called simply "center electrode 10" below). The control electrodes 12*a* and 12*b* are connected with each other (accordingly, these are called simply "control electrode 12" below), and constitute the first condenser C1 to the center electrode 10. The control electrodes 14*a* an 14*b* (accordingly, these are called simply "control electrode 14" below) are connected with each other, and constitute the second condenser C2 to the center electrode 10.

The operation of the above structure will be explained in detail with respect to FIGS. 1 and 2.

In the sensor element 16 having above structure, when an acceleration is applied to the element 16 so that the movable portion of sensor element 16 is displaced to the direction orthogonal to the longitudinal direction of the beams 30*a* and 30*b*, the static capacitance of the first and second condensers C1 and C2 are changed. For example, when the movable portion of sensor element 16 is displaced to the direction X, the gap between the center electrode 10 and the control electrode 12 becomes narrow, and the other gap between the center electrode 10 and the control electrode 14 becomes broad. Accordingly, the static capacitance of the first condenser C1 is increased and that of the second condenser C2 is decreased. In this case, when no acceleration is applied to the movable portion of sensor element 16, the center electrode 10 is positioned to the center between both control electrodes 12 and 14 so that the static capacitance of the first condenser C1 is equal to that of the second condenser C2.

Further, in the sensor element 16, when a predetermined voltage is applied between the center electrode 10 and the control electrode 12, and between the center electrode 10 and the control electrode 14, the position of the center electrode 10 is changed in accordance with a static electric force which is generated therebetween. In other word, it is possible to control the position (or displacement) of the center electrode 10 in response to the control of the static electric force which is controlled from the external stage.

Next, the switch circuit 18, as shown in FIG. 1, includes the first and second switches S11 and S12 which selectively apply either the power voltage VDD or the bias voltage Vb to the control electrodes 12 and 14. The first and second switches S11 and S12 are driven by the PWM signal PT from the control circuit 22. When the PWM signal PT is high, the power voltage VDD is supplied to the control electrode 12 and the bias voltage Vb is supplied to the control voltage 14. On the other hand, when the PWM signal PT is low, the bias voltage Vb is supplied to the control voltage 12 and the power voltage VDD is supplied to the control electrode 14.

The control voltages V1 and V2 are alternately supplied to the control electrodes 12 and 14 in accordance with the power voltage VDD and the bias voltage Vb in response to the PWM signal PT.

When the power voltage VDD is supplied to the control electrode 12 and the bias voltage Vb is supplied to the control electrode 14 through the switch circuit 18, electronic charges are provided in the first condenser C1 in accordance with potential difference (VDD−Vb) generated between the center electrode 10 and the control electrode 12. Further, electronic charges are discharged in the second condenser C2 since the center electrode 10 and the control electrode 14 become the same potential.

When the control voltages V1 and V2 to the control electrodes 12 and 14 are changed by the switch circuit 18, electronic charges are discharged in the first condenser C1, and charged in the second condenser C2. As mentioned above, the first and second condensers C1 and C2 are alternately charged/discharged in accordance with switching of the control voltages V1 and V2 to the control electrodes 12 and 14 through the switch circuit 18.

When the static capacitance of the first condenser C1 is equal to that of the second condenser C2, the amount of the electronic charges, which are charged and discharged from both condensers C1 and C2, are equal to each other. Further, since all electronic charges, which are discharged from one condenser, are charged to the other condenser, the potential of the center electrode 10 is always maintained in the bias voltage Vb.

On the other hand, when the static capacitance of the first condenser C1 is different from that of the second condenser C2, the amount of electronic charge, which is needed to generate the same potential between the condensers C1 and C2, is different therebetween. Accordingly, when switching the control voltages V1 and V2 being supplied to the control electrodes 12 and 14, electronic charges are charged/discharged from the power source, which supplies the bias voltage Vb, to the center electrode 10 in accordance with the difference of the static capacitance between the condensers C1 and C2.

However, since the current is restricted by the resistor Rb, most electronic charges are not moved in the center electrode 10 in a short time so that the potential of the center electrode 10 is changed in such a way that the charged/discharged amount becomes equal between the condensers C1 and C2. That is, the potential of the center electrode 10 is changed in such a way that the potential difference at the condenser in which the static capacitance is decreased, becomes large between the poles thereof, and the potential difference at the condenser which the static capacitance is increased, becomes small between the poles thereof.

For example, when the power voltage VDD is supplied to the second condenser C2, the center electrode 10 is displaced toward the control electrode 12. As a result, when the static capacitance of the first condenser C1 becomes large and the static capacitance of the second condenser C2 becomes small, the potential difference becomes large between the poles of the second condenser C2 so that the potential of the center electrode 10 becomes lower than the bias voltage Vb.

After the above events, when the supply voltage to the control electrodes 12 and 14 is changed and the power voltage VDD is supplied to the first condenser C1, the electronic charges of the second condenser C2 are discharged and the discharged electronic charges are charged to the first condenser C1. However, since the static capacitance of the first condenser C1 is larger than that of the second condenser C2, the potential difference between poles of the first condenser C1 becomes smaller than the value (VDD−Vb) so that the potential of the center electrode 10 becomes higher than the bias voltage Vb. After these steps, the same steps as above are repeated while there is the difference of the static capacitance between the condensers C1 and C2 so that the potential of the center electrode 10 oscillates centering around the bias voltage Vb. In this case, when the center electrode 10 is displaced to the control electrode 14 and the static capacitance of the first condenser C1 is smaller than that of the second condenser C2, the potential of the center electrode 10 becomes lower than the bias voltage Vb.

Next, a static electric force is applied between the control electrodes 12 and 14, to which the power voltage VDD is supplied by the switch circuit 18, and the center electrode 10, to which the bias voltage Vb is supplied, in accordance with the potential difference (VDD−Vb).

Accordingly, when the center electrode 10 is located at a neutral position, when the duty ratio of the PWM signal driving the switch circuit 18 is given by 50%, and when the supplying time ratio of the power voltage VDD to the control electrode 12 is uniform with that of the control electrode 14, the same average static electric force is generated between the center electrode 10 and the control electrodes 12 and 14. As a result, since the static electric forces cancel each other, it appears that the static electric force does not act on the center electrode 10.

On the other hand, when the duty ratio of the PWM signal is not 50%, and when the supply time ratio of the power voltage VDD to the control electrode 12 is not uniform with that of the control electrode 14, a difference occurs between the averaged static electric forces which are applied to the center electrode 10 and the control electrodes 12 and 14. As a result, the difference in the static electric force is applied to the center electrode 10 in the direction of the control electrode of which the supplying time of the power voltage VDD is long.

As explained above, the sensor element 16 of this embodiment can detect the change of the capacitance of the first and second condensers C1 and C2 (i.e., the displacement of the center electrode 10) in accordance with the change of the potential of the center electrode 10 which occurs at the switching of the supply voltage to the control electrodes 12 and 14. Further, by controlling the duty ratio of the PWM signal which drives the switch circuit 18, i.e., the time ratio of the power voltage VDD to the control electrodes 12 and 14, it is possible to control the static electric force which is applied between the center electrode 10 and the control electrodes 12 and 14, and the position of the center electrode 10. In this case, the period of the PWM signal PT is set to a sufficiently small value compared to the period of the proper oscillation (from several hundred Hz to several KHz) of the movable portion of sensor element 16 as the movable portion of sensor element 16 does not oscillate in accordance with the switching of the supply voltage.

Next, the control circuit 22 in this embodiment is explained in detail below.

As shown in FIG. 1, the control circuit 22 includes the first register 34 for holding the digital data Da which digitizes the potential of the center electrode 10 output from the A/D converter 20; the second register 36 for transferring the data stored in the first register 34; the subtraction circuit 38 for calculating the difference between the data stored in the first register 34 and the data stored in the second register 36; the third register 40 for storing the resultant data of the subtraction circuit 38; the control amount setting unit 42 for setting the differential control amount ΔD0 in order to control the center electrode 10 into the neutral position; the fourth register 46 for storing the current control amount D0; the addition circuit 44 for adding the differential control amount ΔD0 to the current control amount Do stored in the fourth register 46; and the PWM circuit 48 for generating the PWM signal PT which has the broader pulse width (high level value) when the control amount D0 is large, based on the control amount D0.

In this case, the control amount D0, which is an output of the fourth register 46, is output to an external stage as the digital detection value of the acceleration sensor. The registers 34, 36, 40 and 46 and the control amount setting unit 42 are synchronously operated based on the reference clocks CK0, and the PWM circuit 48 is synchronously operated based on the dividing clocks CK1.

In the above control circuit 22, the first register 34 receives digital data Da from the A/D converter 20 in response to the reference clocks CK0. In the next timing, the subtraction circuit 38 subtracts the present digital data, which is stored in the first register 34, from the immediately previous digital data which is stored in the second register 36. The resultant data is stored in the third register 40.

Accordingly, if the static capacitance of the first condenser C1 is equal to that of the second condenser C2, the potential of the center electrode 10 becomes constant, and the digital data Da of the potential also becomes constant so that calculated value Db, which is stored in the third register 40, becomes zero. On the other hand, if the static capacitance of the first condenser C1 is not equal to that of the second condenser C2, the calculated value Db (≠0) is stored in the third register 40 in accordance with the difference of the static capacitance.

In this case, the potential of the center electrode 10 oscillates in accordance with the control voltages V1 and V2, and the sign of the calculated value Db is converted in accordance with oscillation. In this case, the value which is subtracted from the digital data Da when the voltage is supplied to the second condenser C2, from the digital data Da when the voltage is supplied to the first condenser C1, is set to a positive data (ST=0). Conversely, the value which is subtracted from the digital data Da (when the voltage is supplied to the first condenser C1) from the digital data Da (when the voltage is supplied to the second condenser C2) is set to an inverted data (ST=1).

Since the control amount setting unit 42, which sets the differential control amount ΔD0 in accordance with the calculated value Db of the third register 40, is simply structured in accordance with sets of the logic circuit, the detailed circuit arrangement is omitted, and only the process in the control amount setting unit 42 will be explained in detail in accordance with the flowchart of FIG. 3.

Figure 3:
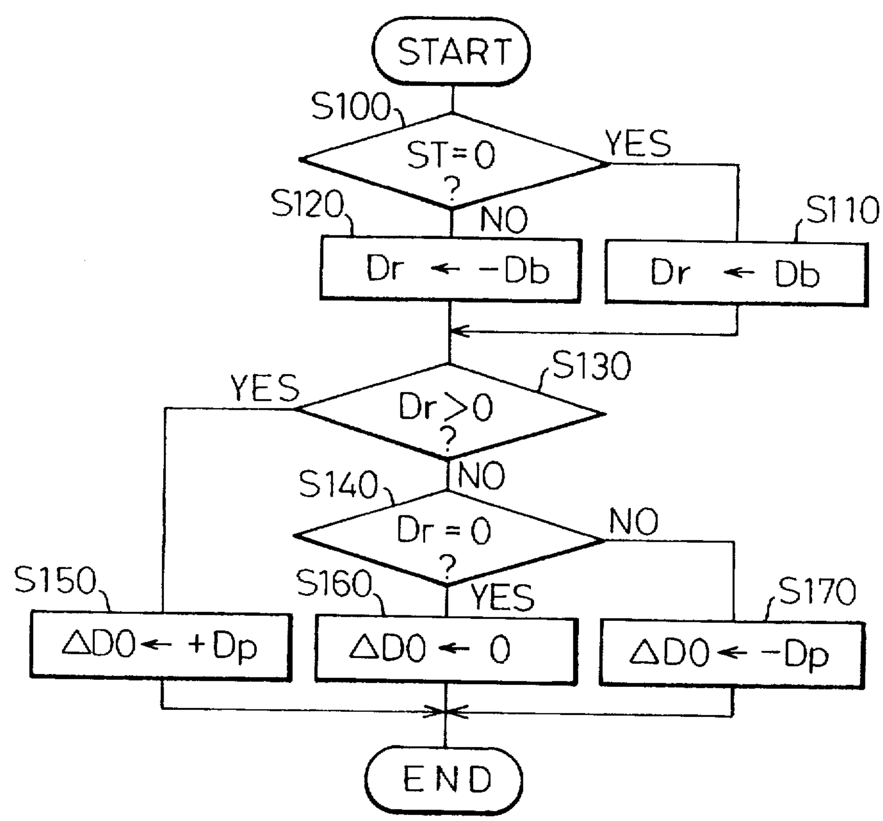
FIG. 3 is a flowchart for explaining process in a control amount setting unit in FIG. 1.

FIG. 3 is a flowchart for explaining the process in the control amount setting unit.

In step 100, the control amount setting unit 42 determines whether the calculated value Db, which is stored in the third register 40, is the positive data (ST=0). When it is the positive data (YES), the calculated value Db is determined as a decision value Dr in step S110 and the process goes to step S130. When the calculated value Db is not the positive value in step S100, i.e., when it is an inverted value (ST=1), the process goes to step S120. The inverted value Dr is determined as the decision value Dr in step S120 and the process goes to step S130.

That is, in steps S110 and S120, the decision value Dr is set to the positive value when the static capacitance of the first condenser C1 is larger than that of the second condenser C2. On the contrary, the decision value Dr is set to the negative value when the static capacitance of the first condenser C1 is smaller than that of the second condenser C2. Further, the decision value is set to zero when the static capacitance of the first condenser C1 is equal to that of the second condenser C2.

In step S130, the control amount setting unit 42 determines whether the decision value Dr is larger than zero. When it is larger than zero, the process goes to step S150. In step S150, the control amount setting unit 42 sets a predetermined value Dp as the differential control amount ΔD0 in order to revise the present control amount D0. On the other hand, when the decision value Dr is smaller than zero, the process goes to step S140.

In step S140, the control amount setting unit 42 determines whether the decision value Dr is equal to zero. When it is zero, the process goes to step S160. The control amount setting unit 42 sets zero as the differential control amount ΔD0. On the other hand, in step S140, when the decision value Dr is smaller than zero, the process goes to step S170. The control amount setting unit 42 sets a predetermined value (−Dp) as the differential control amount ΔD0.

The differential control amount ΔD0, which is set by the above steps, is input to the addition circuit 44. The addition circuit 44 adds the differential control amount ΔD0 to the control amount Do which is stored in the fourth register 46, and updates the control amount D0. The updated control amount D0 is input to the PWM circuit 48. As a result, the PWM circuit 48 generates the PWM signal PT having a pulse width in accordance with the updated control amount Do.

That is, when the static capacitance of the first condenser C1 is larger than that of the second condenser C2, the control amount D0 is increased to only the predetermined value Dp so that PWM signal PT, of which the pulse width becomes broader (i.e., the static electric force of the control electrode 12 is increased), is generated by the PWM circuit 48. On the contrary, when the static capacitance of the first condenser C1 is smaller than that of the second condenser C2, the control amount D0 is decreased to only the predetermined value Dp so that PWM signal PT, of which the pulse width becomes narrower (i.e., the static electric force of the control electrode 14 is increased), is generated by the PWM circuit 48. Further, when the static capacitance of the first condenser C1 is equal to that of the second condenser C2, the present control amount D0 is maintained, and the PWM signal PT maintaining the present state is generated.

Figure 4:
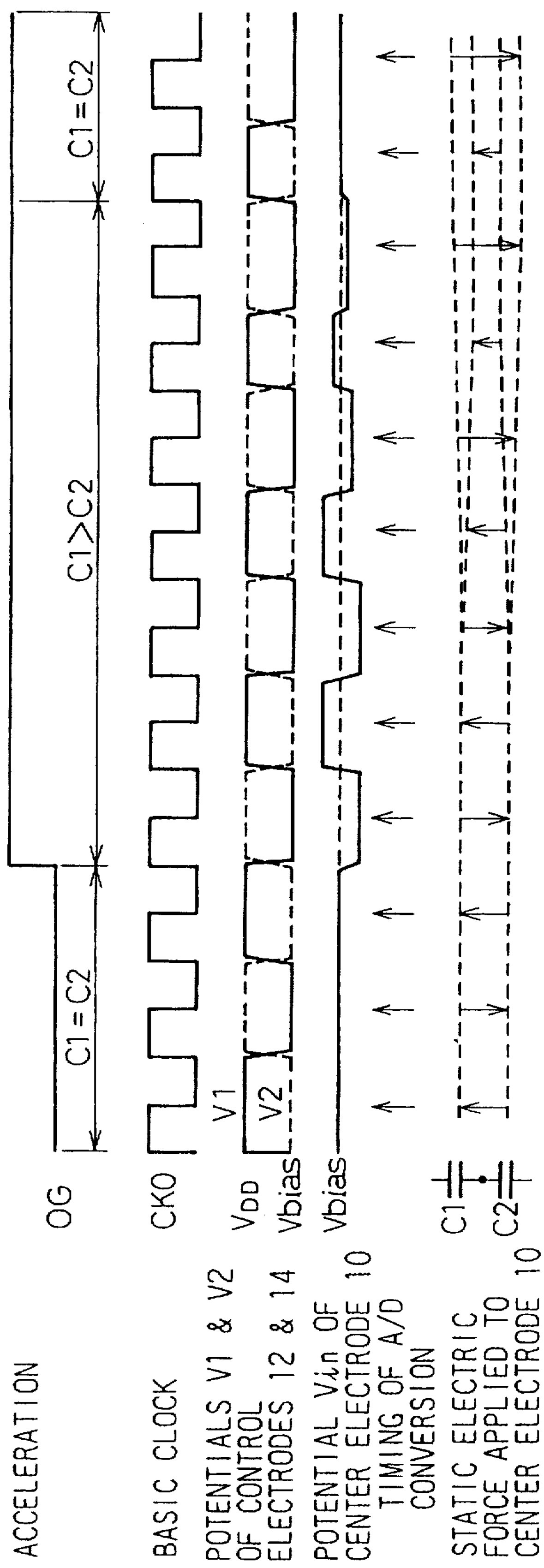
FIG. 4 is a signal timing chart at an acceleration sensor in the first embodiment.

FIG. 4 is a signal timing chart at the acceleration sensor in the first embodiment. When the acceleration is not added to the acceleration sensor 16 (i.e., G=0), the control circuit 22 outputs the PWM signal PT having the duty ratio of 50%. Accordingly, the same static electric force is applied between the center electrode 10 and the control electrodes 12 and 14 so that the position of the center electrode 10 is held in the neutral position. At that time, since the static capacitance of the first condenser C1 is equal to that of the second condenser C2, the potential of the center electrode 10 is always kept constant with respect to the bias voltage Vb, without change, at the time when the voltage is supplied to the control electrodes 12 and 14.

Next, when the acceleration is applied to the acceleration sensor 16 (G≠0), the center electrode 10 is displaced in the direction in which the gap becomes narrow between the center electrode 10 and the control electrode 12. As a result, when the static capacitance of the first condenser C1 is larger than that of the second condenser C2, the potential of the center electrode 10 oscillates in accordance with switching of the supply voltage to the control electrodes 12 and 14.

Further, when the control circuit 22 calculates the output of the A/D converter 20 and detects the displacement of the center electrode 10, the control circuit 22 outputs a PWM signal PT which has a short high level duration and a long low, level duration as the static electric force displacing the center electrode 10 to the control electrode 14 becomes large. As a result, the center electrode 10 is displaced to the control electrode 14, and the center electrode 10 is moved to the balanced position between the static force and the force due to the acceleration.

Based on repetition of the above operations, when the center electrode 10 is returned to the neutral position, the static capacitance of the first condenser C1 is equal to that of the second condenser C2, and the potential of the center electrode 10 becomes constant (i.e., bias voltage Vb). After this step, the control circuit 22 outputs the PWM signal PT of which the duty ratio at that time is maintained.

At that time, since the force applied to the acceleration sensor 16 is balanced with the static electric force applied to the center electrode 10, the control amount D0 which generates the static electric force, and an analog detection value V0 which indicates an average voltage of the PWM signal PT obtained through the low pass filter 24, are set in accordance with the acceleration.

The A/D converter 20 operates in the timing of the trailing edge of the reference clock CK0. The first, second, third and fourth registers 34, 36, 40 and 44 operate on the timing of the leading edge of the reference clock CK0. Accordingly, in actuality, at least three clocks are delayed from the change of the acceleration until the change of the duty ratio of the PWM signal, i.e., the time ratio of the supply voltage to the control electrodes 12 and 14. However, in FIG. 4, in order to simplify the timing chart, the change of the PWM signal is started after two clocks are delayed. The same conditions as shown in FIG. 4 are applied to FIGS. 11 and 14.

Figure 5:
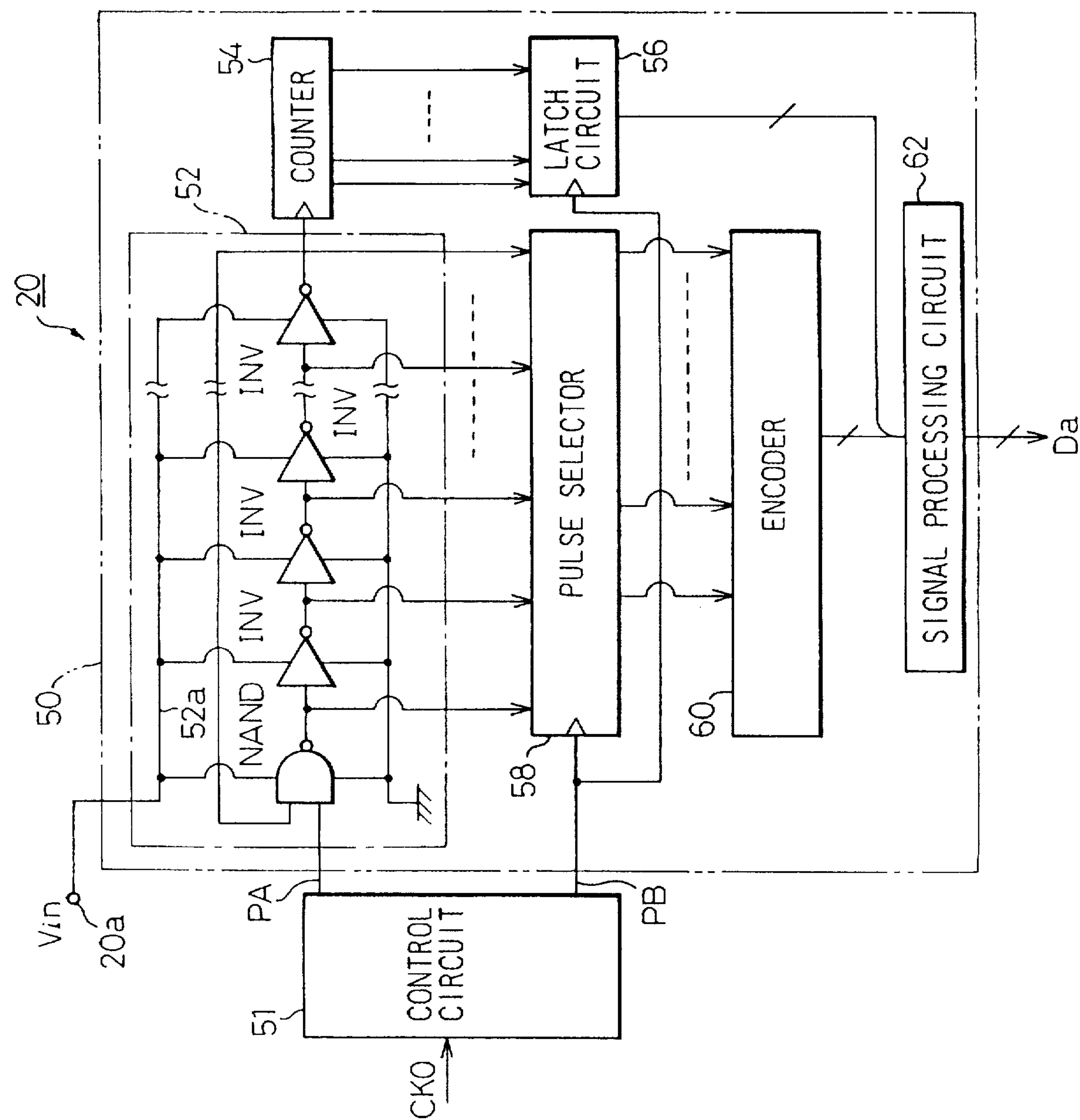
FIG. 5 is a detail block diagram of an A/D converter.
Figure 6:
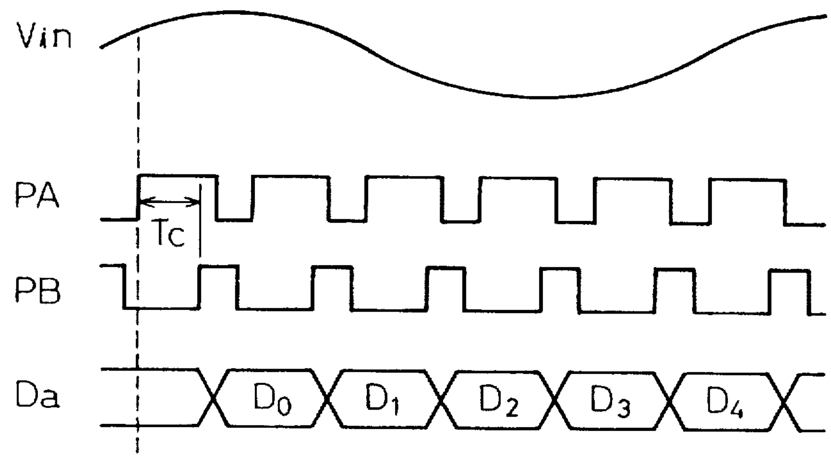
FIG. 6 is a signal timing chart in the A/D converter.

FIG. 5 is a detailed block diagram of the A/D converter 20, and FIG. 6 is a signal timing chart in the A/D converter 20. The A/D converter 20 includes a pulse phase difference coding circuit 50 for coding the phase difference between input pulses PA and PB, and a control circuit 51 for Generating the pulse signals PA and PB in response to the reference clock CK0.

Further, the pulse phase difference coding circuit 50 includes a pulse rotating circuit 52 having a NAND gate and a plurality of ring-coupled inverters INV (even numbers) (i.e., a ring oscillator); a counter 54; a latch circuit 56; a pulse selector 58; an encoder 60; and a signal processing circuit 62. Although the explanations are given of the ring oscillator structured by odd numbers inversion circuits, it may be possible to structure the oscillator by an even number of inversion circuits.

The pulse phase difference coding circuit 50 operates as follows (see JPP-4-58027).

That is, when the pulse signals PA, which are input to the NAND gate, become high, the pulse signals PA start rotating operation in the pulse rotating circuit 52, and the rotating operation of the pulse signals PA are continued during the high level thereof. The number of the rotating operation is counted in the counter 54 which counts the number of inversions of the inverter INV output. When the pulse signals PB which are output from the control circuit 51, become high, the result of the counter 54 is latched into the latch circuit 56.

On the other hand, when the pulse signals PB, which are output from the control circuit 51, become high, the pulse selector 58 detects the rotating position of the pulse signals in the pulse rotating circuit 52 based on the output of each inversion circuit (NAND and inverters INV) in the pulse rotating circuit 52, and the encoder 60 generates binary digital data corresponding to the rotating position. Further, the signal processing circuit 62 generates the binary digital data corresponding to the time Tc from the leading edge of the pulse signal PA until the leading edge of the pulse signal PB by using a binary digital data (lower bit) from the encoder 60 and the binary digital data (upper bit) latched in the latch circuit 56.

In the A/D converter 20, an input terminal **20*a* for a voltage signal Vin to be A/D-converted is connected to a power line 52*a* which supplies the power to each inversion circuit (NAND and inverters INV) in the pulse rotating circuit 52 so that the voltage signal Vin is supplied to each inversion circuit. Since the inversion operating time in each inversion circuit is changed in accordance with the power voltage, when the time Tc is constant, the digital data Da, which is output from the signal processing circuit 62**, is set to the digital data in accordance with the voltage level of the voltage signal Vin.

Further, the control circuit 51 includes an edge detecting circuit for detecting the leading edge of the reference clock CK0; a delay circuit to delay the detected edge signal for the term for holding the pulse signal PA at the high level; and an RS flip-flop circuit which is set by the edge signal and reset by the delay signal; and the control circuit 51 generates the pulse signals PA having the same period as the reference clock CK0. The edge detecting circuit detects the trailing edge of the reference clock CK0. The delay circuit delays the pulse signals PB for the term for holding the pulse signals PB at the high level, and generates the pulse signal PB which rises after the delay time Tc (i.e., a half of period of the reference clock CK0) from the leading edge of the pulse signal PA.

As shown by the timing chart in FIG. 6, the digital data Da corresponding to the voltage signal Vin is output from the pulse phase difference coding circuit 50. Further, since the A/D conversion is periodically executed in response to the period of the pulse signals PA and PB of the control circuit 51, i.e., the reference clock CK0 input to the control circuit 51, the digital data Da is changed so as to be shown by D0 to D4 in accordance with the change of the voltage signal Vin.

A detailed explanation of the pulse phase difference coding circuit 50 is omitted since the contents are disclosed in JPP-4-58027.

As explained above, since the A/D converter 20 is formed without the use of analog circuits, and converts the change of the voltage signal Vin to the change of the delay time of the inversion circuit. Further, since the A/D converter 20 digitizes the delay at the inversion circuit, it is possible to digitize the slight change of the voltage signal Vin so that it is possible to obtain precise digital data Da corresponding to the voltage signal Vin.

Figure 7:
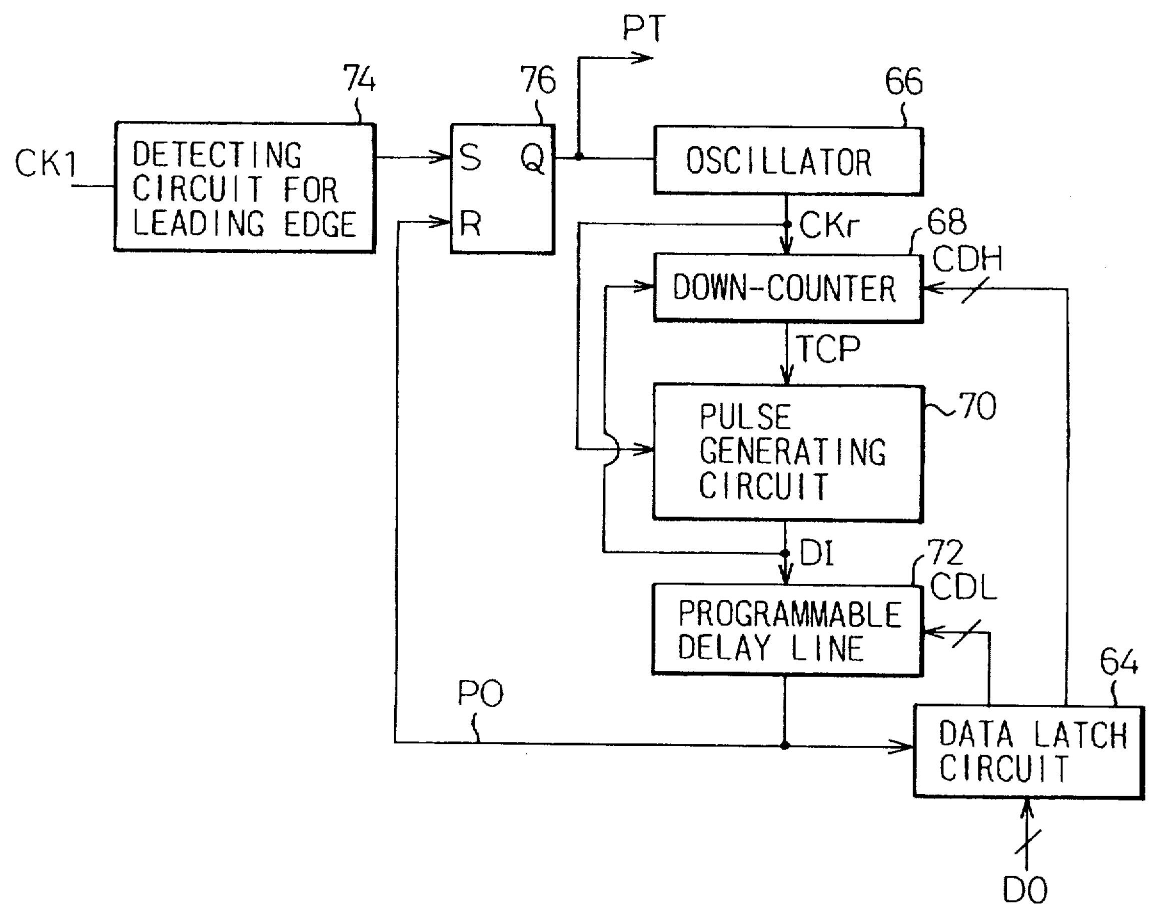
FIG. 7 is a detailed block diagram of a PWM circuit 48 in FIG. 1.

FIG. 7 is a detailed block diagram of the PWM circuit 48 shown in FIG. 1. The PWM circuit 48 is formed without using the analog circuits or the A/D converter. In FIG. 7, the PWM circuit 48 includes a data latch circuit 64, an oscillator 66, a down counter 68, a pulse generating circuit 70, a programmable delay line 72, and an edge detecting circuit 74, an RS flip-flop 76. The PWM circuit 48 outputs the PWM signal PT.

The data latch circuit 64 latches the control amount Do which is input from an external stage, divides the control amount Do into tie lower bit data CDL formed by lower five bits and the upper bit data formed by another bits, and outputs them.

The oscillator outputs an oscillation pulse CKr in a predetermined time interval T when the control pulse PT, which is input from the external stage, is high.

The down counter 68 counts the oscillation pulse CKr which is output from the oscillator 66, and outputs a detecting signal TCP when an count value is reached to an upper bit data CDH which is output from the data latch circuit 64.

The pulse generating circuit 70 takes in the oscillation pulse CKr and outputs the pulse signal DI when the detecting signal. TCP is output from the down counter 68.

The programmable delay line 72 delays the pulse signal DI, which is output from the pulse generating circuit 70, according to the delay time corresponding to the lower bit data CDL which is output from the data latch circuit 64.

The edge detecting circuit 74 detects the leading edge of the clock CK1 which is input from external stage.

The RS flip-flop circuit 76 starts oscillation of the oscillator 66 to obtain a high level control pulse PT when the edge signal is input from the edge detecting circuit 74, and stops oscillation of the oscillator 66 to obtain low level control pulse PT when the delay pulse P0 is input from the programmable delay line 72.

Further, the oscillator 66 includes a ring-oscillator in which the NAND gate and plural inverters are connected in a ring, and the control pulse PT from the RS flip-flop circuit 76 is input to one input terminal of the NAND gate. Further, when the control pulse PT is high, the pulse signal is rotated in the ring oscillator and the oscillation pulse CKr is output from the predetermined inverter synchronized with the rotating period. Still further, the time interval T of the oscillation pulse CKr is set so as to correspond to the delay of thirty-two inverters.

Further, the programmable delay line 72 is formed by five cascade-connected delay stages each of which consists of a basic line for passing the input signal; a delay line for delaying the input signal for the predetermined time to the basic line, and for passing the delayed input signal; and a multiplexer for selecting either the basic line or the delay line as an input path.

In the first delay stage, the difference in the passing time of the input signal between the basic line and the delay line is formed so as to be half the time interval of the oscillation pulse CK0. Similarly, in the second delay stage, the difference of the passing time is formed so as to be one fourth (¼) of the time interval; in the third delay stage, the difference of the passing time is formed so as to be one eighth (⅛) of the time interval, in the fourth delay stage, the difference of the passing time is formed so as to be one sixteenth (1/16) of the time interval; and in the fifth delay stage, the difference of the passing time is formed so as to be one thirty-second (1/32) of the time interval.

That is, in the fifth delay stage, the delay time is set so as to be one stage of the inverter. As mentioned above, these delays can be obtained by cascade-connected inverters which form the ring oscillator. That is, in the programmable delay line 72, by selecting the delay line when the digital value "1" is set to the multiplexer, it is possible to switch the delay time to thirty-two steps in accordance with the lower data CDL as a unit of the delay time for one stage of the inverter.

In this case, the main units of the PWM circuit 48 (data latch circuit 64, oscillator 66, down counter 68, pulse oscillation circuit 70 and programmable delay line 72) are the same contents as disclosed in JPP-4-227492 by the same applicant, the detailed comments will be omitted.

Figure 8:
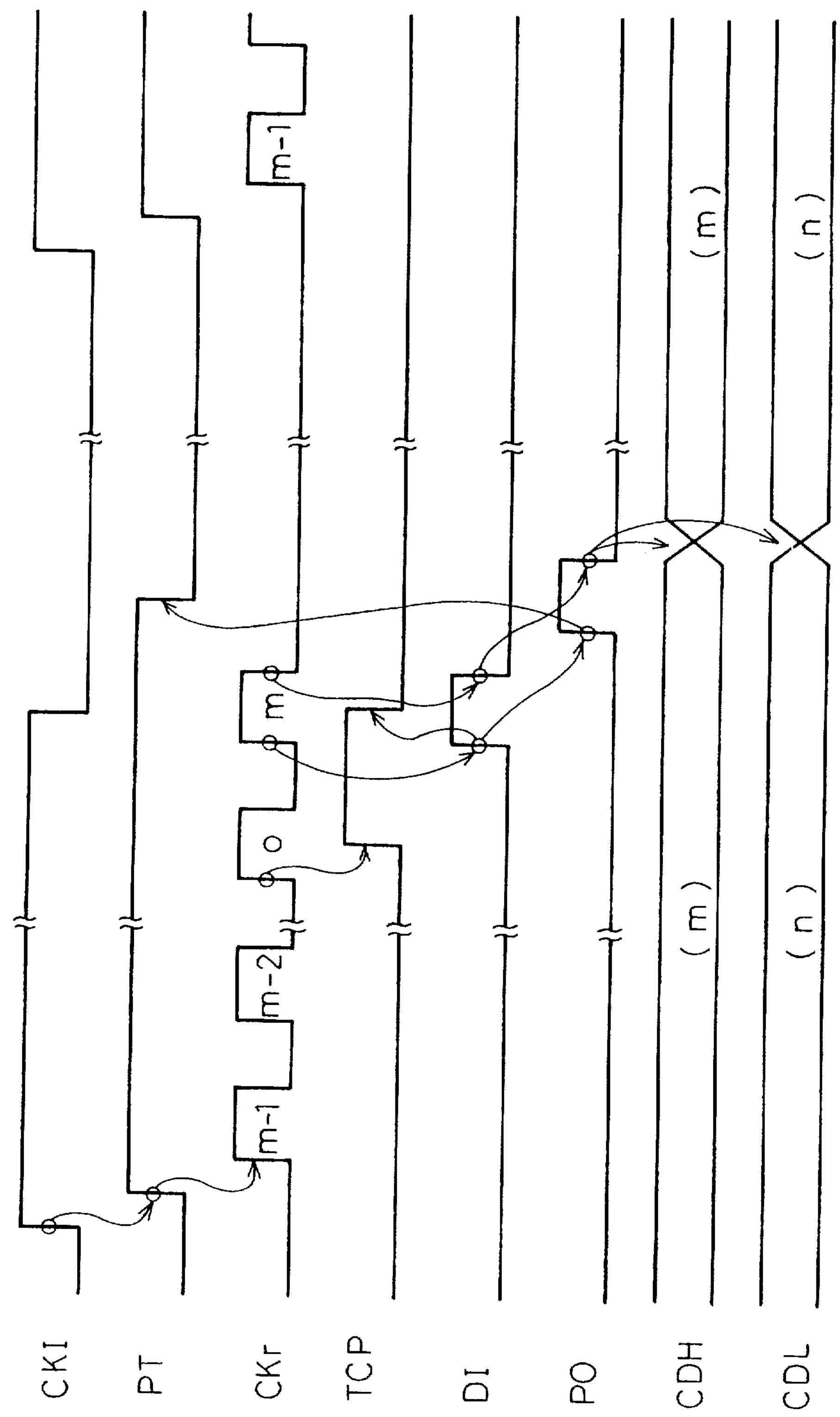
FIG. 8 is a signal timing chart of the operation in the PWM circuit.

FIG. 8 is a signal timing chart of the operation in the PWM circuit 48. When a dividing clock CK1 rises, the control pulse PT becomes high and rotates in the ring oscillator of the oscillation circuit 66. Accordingly, oscillation pulses CKr are output from the oscillation circuit 66 in the predetermined time interval corresponding to the delay time of thirty-two inverters, and the oscillation pulses CKr are counted by the down counter.

The down counter 68 outputs a detecting signal TCP when the upper bit data CDH (=m) of the oscillation pulses CKr are output from the oscillation circuit 66. The detecting signal TCP is delayed by the pulse generation circuit 70 so that the pulse signal DI, which is synchronized with the oscillation pulse CKr output from the oscillation circuit 66, is output from the pulse generation circuit 70. In this case, the down counter 68 is preset by the first oscillation pulse CK0 after output of the detecting signal TCP.

The pulse signal DI, which is output from the pulse generation circuit 70, is delayed for the predetermined time in accordance with the lower bit data CDL in the programmable delay line 72, and output as the delay pulse. The delay pulse P0 resets the RS flip-flop circuit 76 and sets the control pulse PT to the low level so that the oscillation from the oscillation circuit 66 is stopped. Accordingly, the control pulse PT corresponds to the PWM signal having a pulse width based on the control amount Do which is latched in the data latch circuit 64. Further, the delay pulse P0 is input to the data latch circuit 64 in order to update the control data CDI.

As explained above, the PWM circuit 48 is formed without using of an analog circuit, and can set the pulse width in accordance with the delay time of the inversion circuit so that it is possible to realize fine control of the static electric force between the center electrode 10 and the control electrodes 12 and 14.

According to the acceleration sensor in this embodiment, since all structures are formed by digital circuits without using any analog circuit except for the sensor element 16, it is possible to realize a highly integrated circuit except for the sensor element 16 when all structures are formed on a single silicon substrate, making it possible to considerably miniaturize the size of elements of the acceleration sensor.

Further, since the acceleration sensor is formed by digital circuits, the noise characteristics of the sensor and circuit can be improved. Further, since the temperature characteristics can also be improved, the acceleration sensor according to the present invention can be utilized in various fields and various environments.

Still further, since the A/D converter digitizes the voltage signal Vin, which indicates the displacement of the movable portion of the sensor element 16, and obtains the control amount D0 based on digital calculation, it is possible to easily execute adjustment of offset and sensitivity based on the digital calculation.

For example, it is possible to eliminate errors included in the digital data Da from the A/D converter 20 by adding the offset data to the digital data Db which is stored in the third register. Further, it is possible to adjust the sensitivity by multiplying the digital data by a preferred magnification and by changing the differential control amount ΔD0 which is set by the control amount setting unit 42.

Still further, according to the acceleration sensor in this embodiment, as mentioned above, since the A/D converter 20 digitizes the change of the voltage, and since the PWM circuit 48 modulates the pulse width in accordance with the delay time of the inverter, the acceleration sensor can detect a fine change in the potential of the central electrode 10 and can obtain the digital value thereof so that it is possible to realize fine adjustment of the static electric force and fine control of the position of the movable portion 16*a*. As a result, it is possible to detect the acceleration which is applied to the acceleration sensor with very high precision.

Still further, according to the acceleration sensor in this embodiment, since the digital control amount Do is output in response to the acceleration applied to the acceleration sensor, it is possible to directly take the output of the sensor in the CPU so that it is possible to simplify the structure of a system which executes various controls by using the acceleration sensor and the CPU.

Next, the acceleration sensor according to the second embodiment will he explained in detail below.

As explained above, in the first embodiment, in order to control the position of the center electrode 10, the control circuit 22 generates the PWM signal and controls the voltage supplying time to the control electrodes 12 and 14 so that the static electric force between the center electrode 10 and each control electrode 12 and 14 is controlled. In this second embodiment, two kinds voltages each having opposite polarity at the center electrode 10, are supplied to the control electrodes 12 and 14 in order to control the static electric force by controlling the potential of the center electrode 10.

Figure 9:
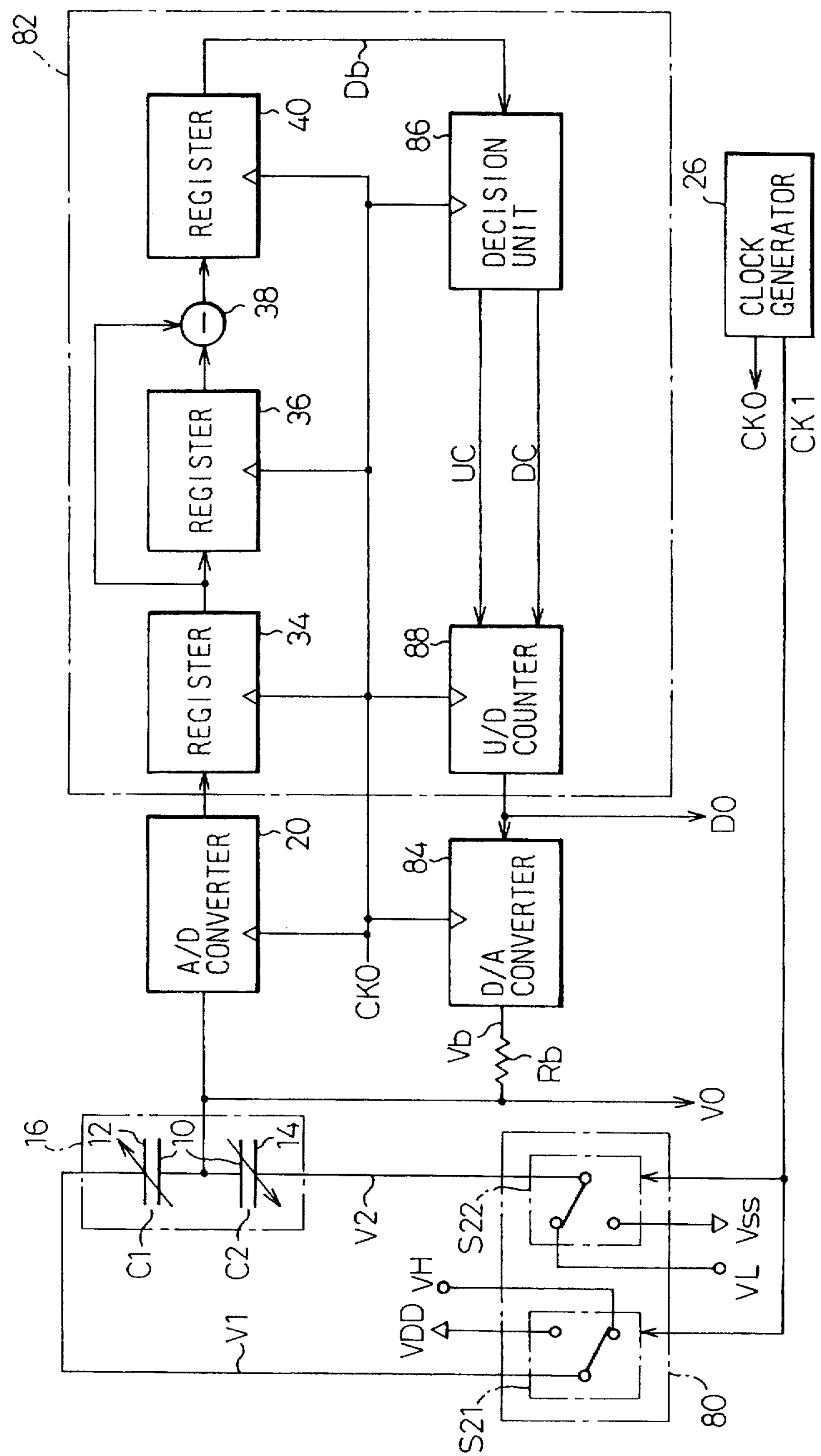
FIG. 9 is a detailed block diagram of the acceleration sensor according to the second embodiment of the present invention.

FIG. 9 is a detailed block diagram of the acceleration sensor according to the second embodiment of the present invention. The acceleration sensor according to the second embodiment is formed by the sensor element 16, a switching circuit 80, the A/D converter 20, a control circuit 82, a D/A converter 84, and a clock generator 26.

The sensor element 16 includes the first and second condensers C1 and C2 consisting of the center electrode 10 and the control electrodes 12 and 14, and the differential capacitance condenser uses condensers C1 and C2.

The switching circuit 80 supplies the control voltages V1 and V2 to the control electrodes 12, and 14. The A/D converter 20 digitizes the voltage signal Vin from the center electrode 10, and outputs the digital data Da. The control circuit 82 sets the potential of the center electrode 10 to the control amount D0 based on the digital data from the A/D converter 20. The D/A converter 84 generates the bias voltage Vb based on the control amount D0 from the control circuit 82. The clock generator 26 generates the reference clock CK0 and the dividing clock CK1 divided therefrom. The bias voltage Vb generated by the D/A converter 84 is supplied to the center electrode 10 through the resistor Rb for current limitation.

In the second embodiment, since the sensor element 16, the A/D converter 20, and the clock generator 26 are the same as in the first embodiment, the explanations are omitted.

First, the switching circuit 80 consists of the first switch S21 for selectively supplying either the first drive voltage VDD or the second drive voltage VH to the control electrode 12, and the second switch S22 for selectively supplying either the third drive voltage VSS or the fourth drive voltage VL to the control electrode 14. The switching circuit 80 is driven by third dividing clock CK1, and supplies the first and third drive voltages VDD, VSS when the dividing clock CK1 is high, and supplies the second and fifth voltages VH, VL when the dividing clock CK1 is low.

In this case, each voltage VDD, VH, VSS and VL is set to the following equations (1) and (2).

$$VDD>VH>VL>VSS \quad (1)$$

$$VDD-VH=VL-VSS \quad (2)$$

Further, the bias voltage Vb, which is generated by the D/A converter 84 in accordance with the control amount D0, is set to the range between the second drive voltage VH and the fourth drive voltage, i.e., is set to the range (VH>Vb>VL), and is supplied to the center electrode 10 through the resistor Rb for the current limitation.

That is, the control voltages V1 and V2, each of which has opposite polarity to the potential of the center electrode 10, are supplied to the control electrodes 12 and 14. In this case, the potential difference between the center electrode 10 and each control voltage V1, V2 is changed periodically for the same voltage (VDD−VH, VL−VSS).

Further, in the sensor element 16 to which the switch circuit 80 is connected, when the center electrode 10 is positioned at the middle, and when the potential of the center Electrode 10 is at the center potential Vc of the supply voltage (i.e., (VDD+VSS)/2=(VH+VL)/2) to the control electrodes 12 and 14, the potential difference between the center electrode 10 and the control electrode 12 becomes the same as the potential difference between the center electrode 10 and the control electrode 14. Accordingly, when the static electric forces between these electrodes become the same so that the static electric forces cancel each other, then, it is obvious that no static force acts on the center electrode 10.

On the other hand, when the potential of the center electrode 10 is not the center potential Vc, the potential difference between the center electrode 10 and each control electrode 12 and 14 becomes different. Accordingly, the static force at the center electrode 10 is applied to the direction of the control electrode having the larger potential difference.

Further, the amount of electronic charge in the first and second condensers C1 and C2 are changed at the time when the switching circuit 80 switches the supply voltage between control electrodes 12 and 14. On the other hand, the amount of the electronic charge at the center electrode 10 is not changed for a short period in accordance with the action of current limitation by the resistor Rb so that electronic charges having the same amount, but different polarity, cancel or polarize each other. As a result, the amount of electronic charge of the condensers C1 and C2 is always changed (increased/decreased) in accordance with the same amount of electronic charges.

Still further, when the static capacitance of the first condenser C1 is equal to that of the second condenser C2, since the (change of the potential difference between poles of each condenser C1 and C2 is the same, the potential of the center electrode 10 is kept constant without change before and after switching of the supply voltage.

On the other hand, when the static capacitance of the first condenser C1 is different from that of the second condenser C2, since the change of the potential difference between poles of each condenser C1 and C2 is different each other, the potential of the center electrode 10 is changed before and after switching of the supply voltage. Further, since the switching of the supply voltage is performed periodically, the potential of the center electrode 10 always oscillates when there is the difference of the static capacitance between the condensers C1 and C2.

As explained above, in the sensor element 16 according to the second embodiment, the change of capacitance of the first and second condensers C1 and C2 (i.e., change of potential of the center electrode 10) can be detected based on the change of the potential of the center electrode 10 which is generated when switching the supply voltage to the control electrodes 12 and 14. Further, by controlling the potential of the center electrode 10, it is possible to control the static electric force applied between the center electrode 10 and each control electrode 12 and 14 so that it is possible to control the position of the center electrode 10.

Next, the operation of the control circuit 82 will be explained in detail bellow. The control circuit 82 sets the control amount D0 which is used for generating the bias voltage Vb from the D/A converter 84. As shown in FIG. 9, the control circuit 82 includes the first, second and third registers 34, 36 and 40; a subtraction circuit 38; an up/down counter (U/D counter) 88 for outputting the count value used as the control amount D0 in order to generate the bias voltage Vb to be supplied to the center electrode 10; and a decision unit 86 for determining increment/decrement of the U/D counter 88 based on the digital data Db stored in the third register 40, and outputting either an up-count signal UC or a down count signal DC to operate the U/D counter 88 in accordance with the result of the determination.

In this case, the operations of the first, second and third registers 34, 36 and 40, and the subtraction circuit 38, are omitted since these are the same as in the first embodiment.

Since the decision unit 86 is simply formed by sets of logic circuits, the detailed circuit arrangement is omitted and the operation of the decision unit is explained in detail with reference to the flowchart of FIG. 10 below.

Figure 10:
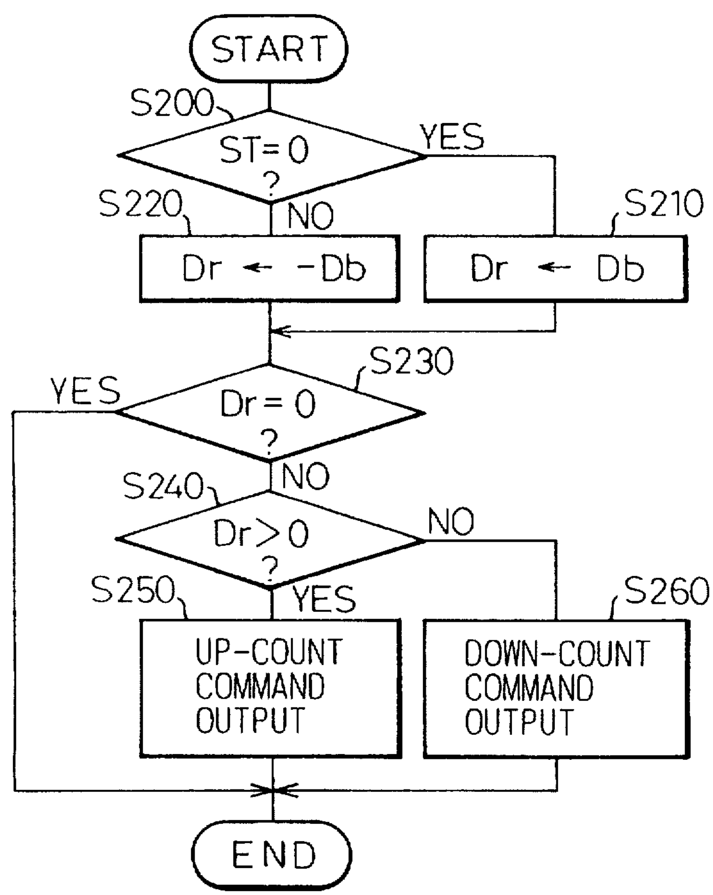
FIG. 10 is a flowchart for explaining the operation in the decision unit.

FIG. 10 is a flowchart for explaining the operation in the decision unit. In FIG. 10, first, steps S210 and S220 are the same steps as S110 and S120 indicating the processes at the control amount setting unit 42 in the first embodiment. In the steps S210 and S220, the decision value Dr is set by the digital data Db, and the process goes to step S230. In the second embodiment, however, the digital value Db is set to the positive data (ST=0) which subtracts the A/D-converted value, when supplying the second and fourth drive voltages VDD and VSS to the control electrodes 12 and 14, from the A/D-converted value, when supplying the first and third drive voltages VDD and VSS to the control electrodes 12 and 14. On the other hand, the digital value Db is set to the inverted data (ST=1) which subtracts the A/D-converted value, when supplying the first and third drive voltages VDD and VSS, from the A/D-converted value, when supplying the second and fourth drive voltages VDD and VSS.

In step S230, the control amount setting unit 42 determines whether the decision value Dr is "0" or not. When the value is "0" (YES), the process is completed. When the value is not "0" (NO), the process goes to step S240.

In step S240, the control amount setting unit 42 determines whether the Decision value Dr is larger than "0" or not. When the value is larger than "0" (YES), the process goes to step S250. In step S250, the control amount setting unit 42 outputs the up-count signal UC which increments the U/D counter 88. On the other hand, when the decision value Dr is smaller than "0" (NO, in step S240), the process goes to step S260. In step S260, the control amount setting unit 42 outputs the down-count signal DC which decrements the U/D counter 88.

Further, the count value in the U/D counter 88 is increased or decreased in accordance with the up-count signal UC or the down-count signal DC each of which is output from the decision unit 86.

That is, the decision unit 86 increases the count value (i.e., control amount D0) when the static capacitance of the first condenser C1 is larger than that of second condenser C2. On the contrary, the decision unit 86 decreases the control amount D0 when the static capacitance of the first condenser C1 is smaller than that of second condenser C2. Further, the decision unit 86 maintains the present control amount D0 when the static capacitance of the first condenser C1 is equal to that of second condenser C2.

The control amount D0 is converted to the predetermined voltage in the D/A converter 84, and supplied to the center electrode 10 as the bias voltage Vb.

Figure 11:
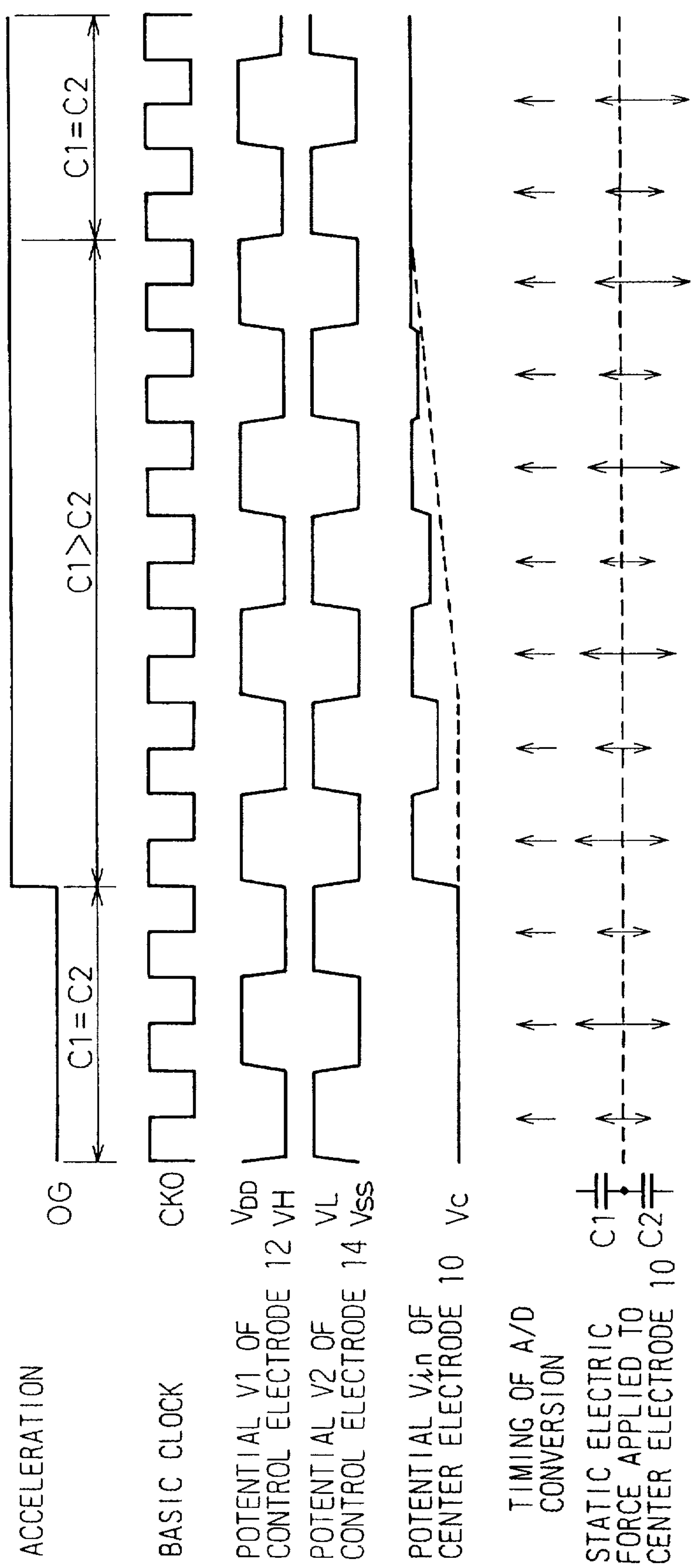
FIG. 11 is a signal timing chart for the operation at the acceleration sensor in the second embodiment.

FIG. 11 is a signal timing chart for the operation of the acceleration sensor in the second embodiment.

When no acceleration force is applied the acceleration sensor (G=0), the potential of the center electrode 10 is set to the center potential Vc by the D/A converter 84. As a result, the static electric forces each have the same intensity, but in opposite directions from each other, are applied between the center electrode 10 and both control electrodes 12 and 14. Further, at that time, since the static capacitance of the condenser C1 is equal to that of second condenser C2, the potential of the center electrode 10 is kept constant (center potential Vc) without change when switching the supply voltage to the control electrodes 12 and 14.

Next, when an acceleration force is applied to the acceleration sensor (G≠0), the center electrode 10 is displaced in the direction which the gap between the center electrode 10 and the control electrode 12 becomes narrow. As a result, when the static capacitance of the first condenser C1 becomes larger than that of the second condenser C2, the potential of the center electrode 10 becomes larger than the center potential Vc and oscillates in accordance with switching of the supply voltage to control electrodes 12 and 14.

Further, when the control circuit 82 calculates the output of the A/D converter 20 and detects the change of the potential of the center electrode 10, the control circuit 82 outputs the control amount D0 for generating the bias voltage Vb from the D/A converter 84 and for increasing the static electric force in order to pull the center electrode 10 toward the control electrode 14. Based on the control amount D0, the D/A converter 84 generates the bias voltage Vb (shown by dotted line in FIG. 11) and supplies it to the center electrode 10.

At that time, the charge for generating the static electric force is gradually charged to the center electrode 10 so that the center electrode 10 is pulled toward the control electrode 14 until the balance position between the static electric force and the force caused by the acceleration. After the above operations are repeated, when the center: electrode 10 is returned to the neutral position, the static capacitance of the first condenser C1 is equal to that of the second condenser C2 so that the potential of the center electrode 10 becomes constant as does the bias; voltage Vb which is output from the D/A converter 84.

In this case, since the static electric force applied to the center electrode 10 is balanced by a force applied to the acceleration sensor, the control amount Do for generating the static electric force and the potential V0 (=Vin) of the center electrode 10 are given in accordance with the acceleration.

As explained above, according to the acceleration sensor in the second embodiment, since all structures are formed by the digital circuits except for sensor element 16 and the D/A converter 84, it is possible to easily realize the same effects as the first embodiment.

According to the acceleration sensor in the second embodiment, the A/D converter 20 always converts analog signals, which change at constant time intervals, to digital signals so that the A/D converter 20 has sufficient time for performing A/D conversion compared to A/D conversion at the first embodiment, i.e., the duty ratio of the signal is changed in the first embodiment. As a result, it is possible to easily design the A/D converter 20 compared to the first embodiment.

In the second embodiment, the output of the U/D counter 88 is converted to the voltage value by the D/A converter 84 and supplied to the center electrode 10 through the resistor. Further, as explained in the first embodiment, the PWM signal is generated in accordance with the control amount D0, and transmitted to the low-pass filter in order to generate the analog voltage. The analog voltage is supplied to the center electrode 10 through the resistor. In this case, since the D/A converter 84 is not used, it is possible to obtain the same effect as the first embodiment.

Figure 12:
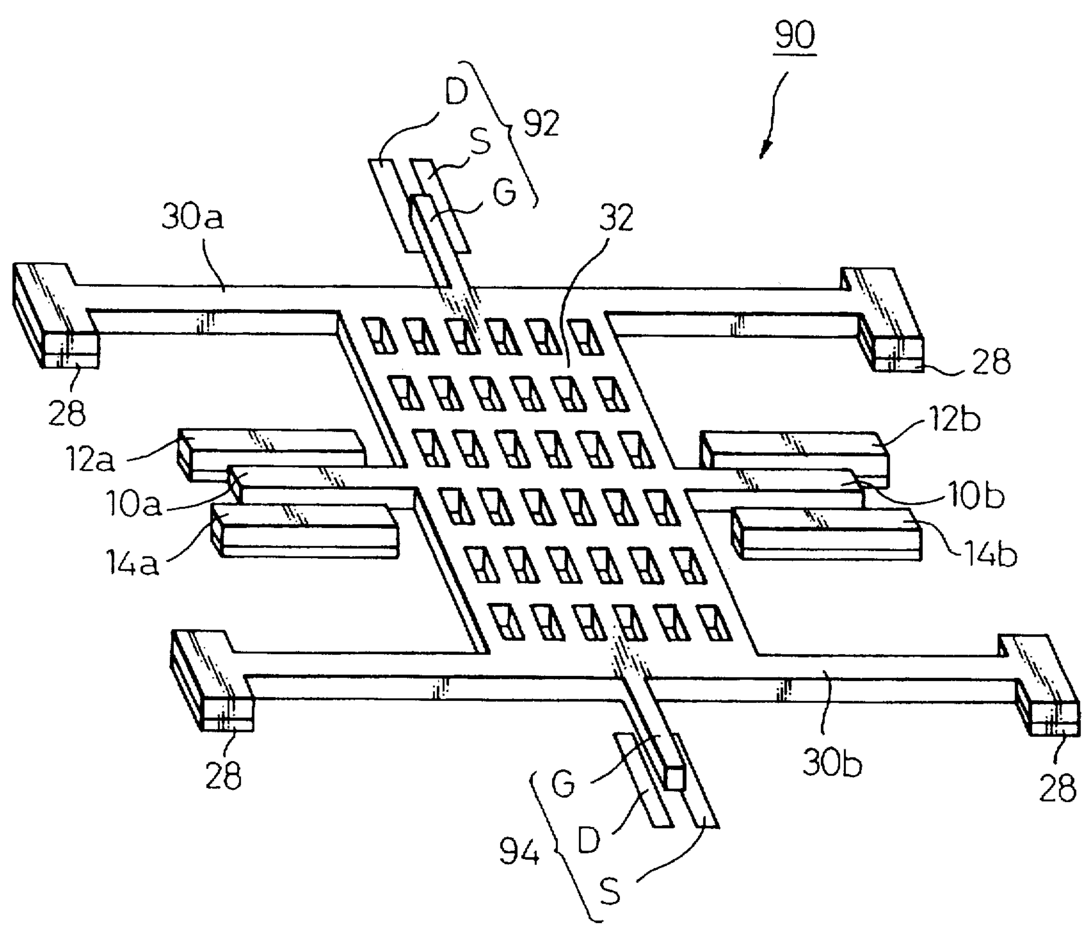
FIG. 12 is a perspective view of the sensor element according to the second embodiment of the present invention.

In the acceleration sensor in the first and second embodiments, although the sensor element 16 performs displacement detection and position control of the movable portion in accordance with the operations of the center electrode 10 and the control electrodes 12 and 14, as shown in FIG. 12, by using the sensor element 90, it is possible to perform displacement detection of the movable portion by using another means as explained below.

FIG. 12 is a perspective view of the sensor element according to the second embodiment of the present invention. In addition to the sensor element 16 of the first embodiment, the sensor element 90 includes two movable electrodes G and two MIS (Metal Insulator Semiconductor)-type transistors 92 and 94. Each movable electrode G is used for detecting the displacement and projects from an approximate center of the corresponding beams 30*a* and 30*b* to the outside direction therefrom.

Two MIS-type transistors 92 and 94 are used as a pair of MIS-type transistor. Each MIS-type transistor includes fixed electrodes S and D (i.e., fixed electrodes for displacement detection) each of which consists of an impurity diffusion layer formed on the silicon substrate just under the movable electrode G so as to become in parallel to the movable electrode G and to be positioned in both sides of the movable electrode G. Further, in the MIS-type transistor, the movable electrode G is used as a movable gate, and the fixed electrodes S and D are used as the source and drain. Still further, a gap between the movable electrode G and the fixed electrodes S and D are used as an insulation layer. In this case, when the movable electrode G is positioned on the neutral position, half the area of the movable electrode G faces half the area of each fixed electrode S and D. The beams 30*a* and 30*b*, the mass portion 32, the center electrode 10 and the movable electrode G are called the movable unit 90*a*.

In the sensor element 90 structured as above, when the voltage is supplied to the movable electrodes G of the MIS-type transistors 92 and 94, a channel is formed in an area opposite to the movable electrode Gs between the fixed electrodes S and D, and a drain current flows in the channel. Further, the channel width, which is formed between the fixed electrodes S and D, is changed in accordance with the potential of the movable electrodes G so that the drain current is modulated.

In this case, the movable electrode Gs of each transistor 92 and 94 are formed in opposite directions with respect to each other along the direction of the displacement of the movable portion 90*a*. Accordingly, when the movable portion 90*a* is displaced in the direction which the gap between the center electrode 10 and the control electrode 12 becomes narrow, the area, which faces the movable electrodes G and the fixed electrodes S and D, is increased so that the drain current is increased in the MIS-type transistor 92. On the other hand, the area is decreased so that the drain current is decreased in the MIS-type transistor 94.

As explained above in the sensor element 90, the center electrode 10 and the control electrode 12 is used only for position control of the movable portion 90*a*, and the MIS-type transistors 92 and 94 are used for displacement detection of the movable portion 90*a*.

Next, the acceleration sensor according to the third embodiment of the present invention will be explained in detail below.

Figure 13:
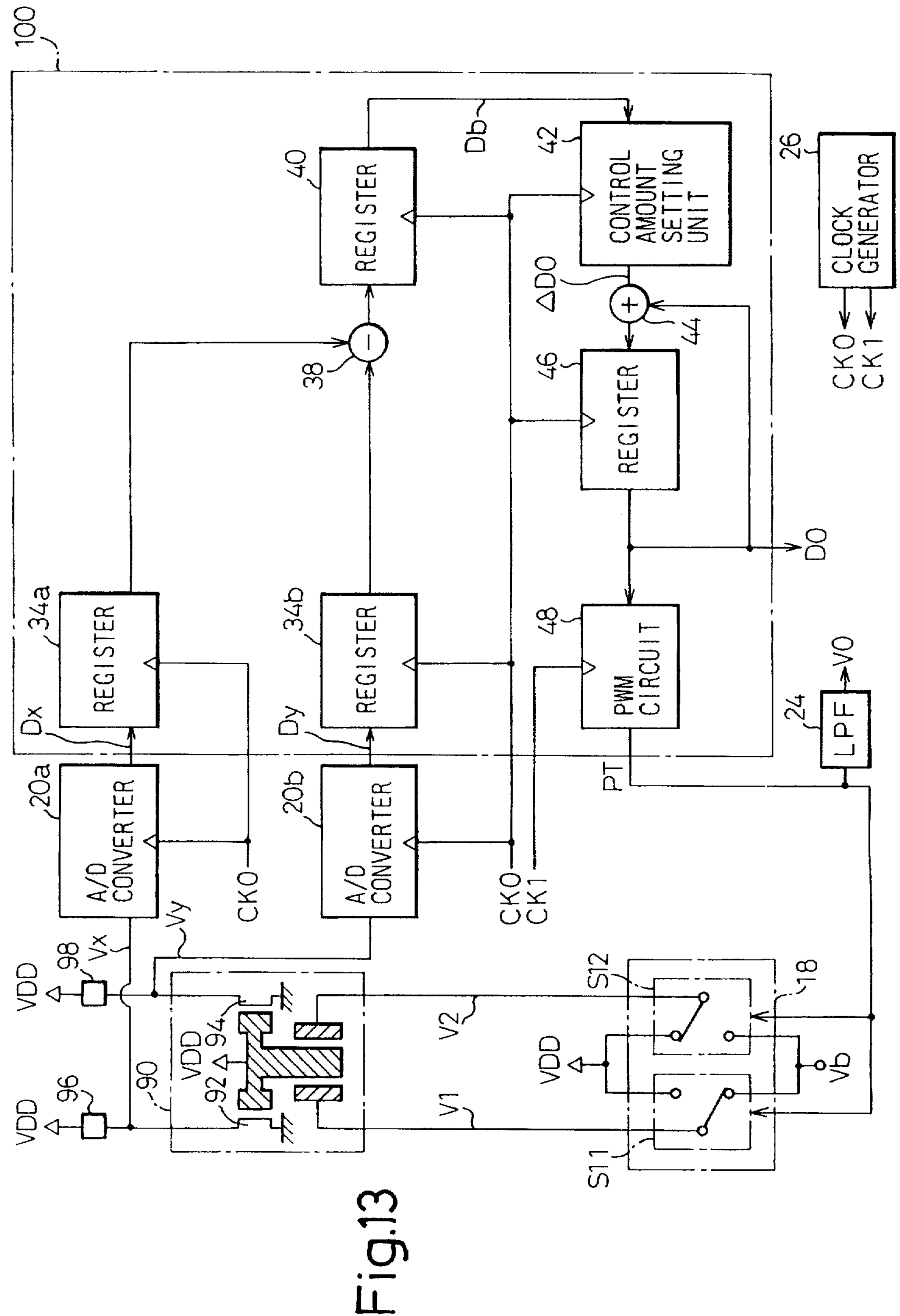
FIG. 13 is a detailed block diagram of the acceleration sensor in the third embodiment.
Figure 14:
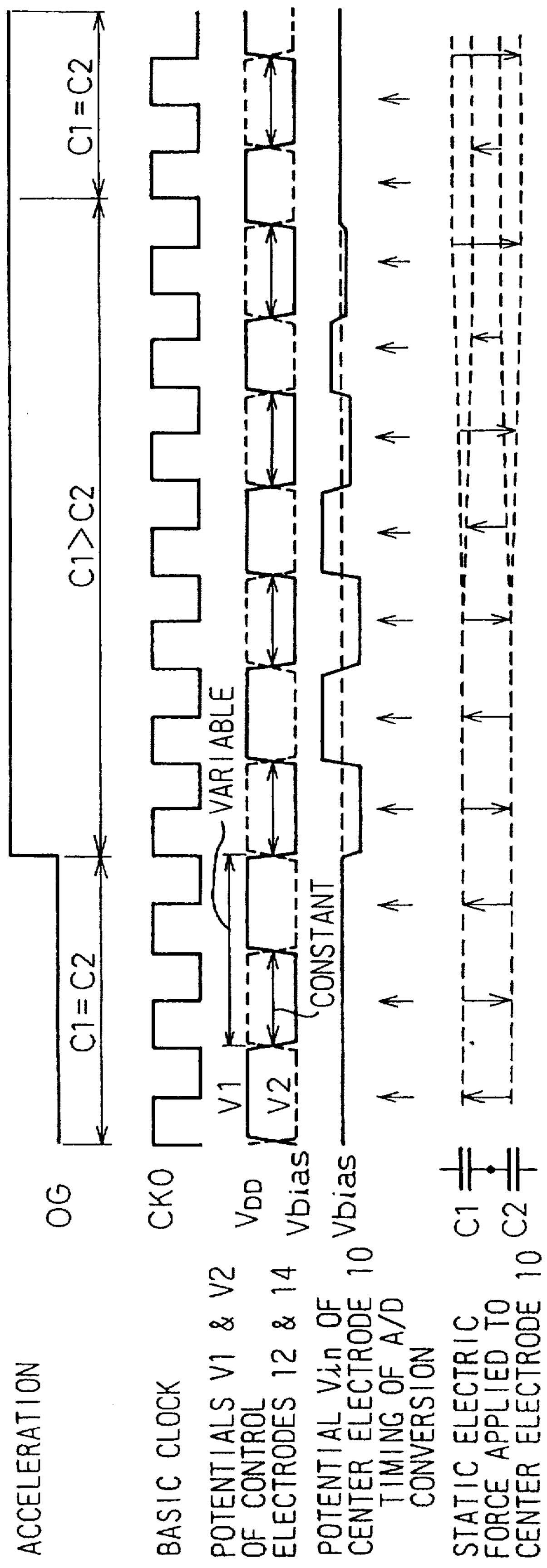
FIG. 14 is a signal timing chart when the switching circuit is controlled by the pulse period modulation signal in the first and third embodiment.

FIG. 13 is a detailed block diagram of the acceleration sensor in the third embodiment, and FIG. 14 is a signal timing chart when the switching circuit 18 is controlled by the pulse period modulation signal in the first and third embodiment.

The acceleration sensor of this embodiment includes sensor element 90 having the central electrode 10, the control electrodes 12 and 14, and the MIS-type transistors 92 and 94; resistors 96 and 98 each connected to the corresponding MIS-type transistor 92 and 94 and for converting the drain current to the voltage signal; A/D converters 20*a* and 20*b* each connected to the corresponding resistors 96 and 98 for inputting the voltage signals Vx and Vy, which are obtained from the sensor element 90, and for outputting digital data Dx and Dy; a control circuit 100 for generating the pulse width modulation signal PT based on the digital data Dx and Dy from the A/D converters 20*a* and 20*b*; the switching circuit 18; the low-pass filter 24; and the clock generator 26 (18, 24 and 26 are the same as in the first embodiment). The power voltage VDD is supplied to the center electrode 10 and the movable electrodes G of the MIS-type transistors 92 and 94, and the static electric force is applied to the enter electrode 10 when the bias voltage Vb is supplied to the control voltages 12 and 14.

Next, the control circuit 100 will be explained in detail below.

As previously explained, in the control circuit according to the first embodiment, the first register 34 holds the currently A/D-converted value, the second register 36 holds the just previously A/D-converted value, the subtraction circuit 38 calculates the difference between the currently A/D-converted value and the previously A/D-converted value, and the third register 40 holds the value calculated by the subtraction circuit 38.

In the control circuit 100 according to the third embodiment, the first register 34*a* holds the digital data Dx and the second register 34*b* holds the digital data Dy, the subtraction circuit 38 calculates the difference between outputs from the first and second registers 34*a* and 34*b*, and the third register 40 stores the value calculated by the subtraction circuit 38.

Accordingly, the outputs of the MIS-type transistors 92 and 94 are converted to a single output which indicates a signal level in response to the displacement of the movable portion 90*a* and is output from the third register 40. As a result, it is not necessary to invert the digital data Db stored in the third register 40, and the digital data Db can be used as the decision value Dr without any change. Accordingly, it is possible to omit the steps S100 to S130 at the control amount setting unit 42 shown in FIG. 3.

Like the first embodiment, in the third embodiment the control amount setting unit 42 sets the differential control amount ΔD0 based on the decision value Dr, calculates the control amount D0 from the accumulated differential control amount ΔD0, generates the PWM signal PT at the PWM circuit 48 based on the control amount D0, and performs position control of the movable portion 90*a*.

In the acceleration sensor according to the third embodiment, as explained above, the detection of displacement of the movable portion 90*a* is performed by the MIS-type transistors 92 and 94, a large current can flow in the control circuit 100 compared to the output of the differential capacitance condenser which is formed by the center electrode 10 and control electrodes 12 and 14, and the input impedance of the A/D converters 20*a* and 20*b* can be suppressed to lower value. As a result of the above structure, it is possible to provide an apparatus having improved anti-noise characteristics.

As explained above, since the outputs of the MIS-type transistors 92 and 94 are changed into a single output having the signal level in accordance with the displacement of the movable portion 90*a*, it is not necessary to invert the digital data Db, which are stored in the third register 40, for every clock so that it is possible to simplify the structure of the apparatus.

Further, although two A/D converters 20*a* and 20*b* are provided in the third embodiment, it is possible to use one converter which alternately obtains numerical values by time-sharing each output from the MIS-type transistors 92 and 94. Still further, the sensor element and circuit may be structured on another chip.

Figure 15:
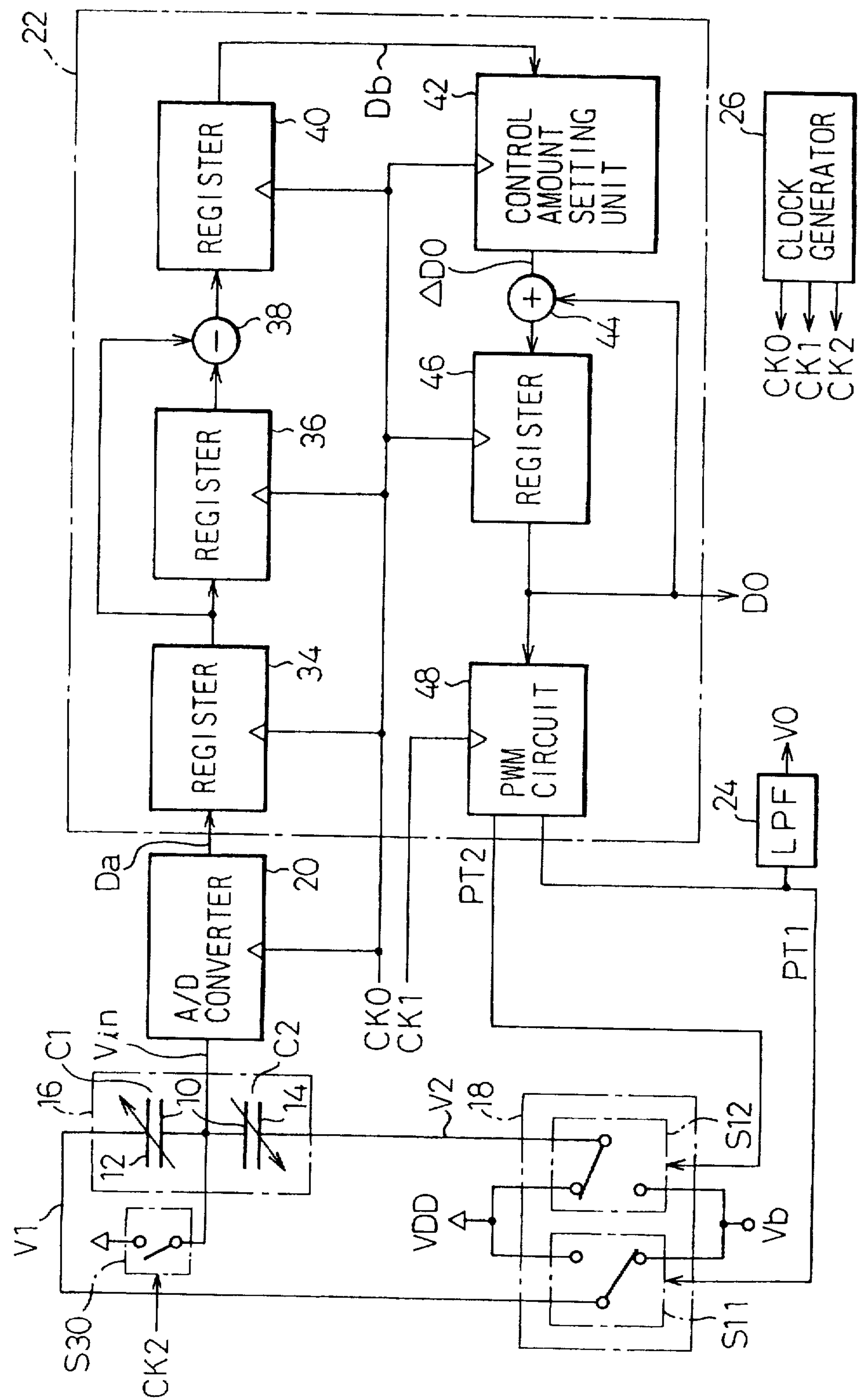
FIG. 15 is a detailed block diagram of the acceleration sensor according to the fourth embodiment of the present invention.

FIG. 15 is a detailed block diagram of the acceleration sensor according to the fourth embodiment of the present invention. The fourth embodiment of FIG. 15 is equivalent to the first embodiment of FIG. 1 except that there are two different points, i.e., a switch S30, which is turned on/off by clock CK2, is provided instead of the resistor Rb in FIG. 1, and the PWM circuit 48 outputs two PWM signals PT1 and PT2. That is, one of two PWM signals (PT1) is input to the switch S11, and the other (PT2) is input to the switch S12.

Although it is necessary to provide a very high resistance value (for example, several MΩ) for the resistor Rb in FIG. 1, by providing the switch S30 instead of the resistor Rb as shown in FIG. 15, it is possible of easily perform pre-charge operation to the center electrode 10 of the sensor element 16.

Further, since the duty ratio can be separately controlled in accordance with the PWM signals PT1 and PT2 so that it is possible to realize the fine adjustment. In this embodiment, the low-pass filter 24 can be optionally connected either the PT1 or the PT2.

Still further, it is possible to delete the center potential Vb if the bias voltage of the center electrode 10 is set to VDD (or GND), and the voltages VDD and GND are alternately switched by using the switches S11 and S12.

The present invention is not limited to the above embodiments, and various embodiments are possible to realize the present invention within a scope of the patent.

For example, in the above embodiments, in the sensor element 16 (90), although the center electrode 10 is provided to the movable portion of sensor element 16 (90) and the control electrodes 12 and 14 are provided on the substrate, on the contrary, it is possible to provide the center electrode 10 on the substrate, and to provide the control electrodes 12 and 14 to the movable portion of sensor element 16 (90). Although two of the center electrode 10 and the control electrodes 12, 14 are provided both sides of the mass portion 32, it is possible to provide three or more the center electrode 10 and the control electrodes 12, 14.

As is obvious from above explanations, there are the following problems in the conventional arts, i.e., a) When a circuit is integrated on a substrate, since a resistor and condenser have a large size compared to a switching element. (for example, a transistor.) the size of the sensor becomes large in the analog circuit in which a lot of resistors and condensers are used therein.

b) Further, in an control circuit formed by an analog circuit, since it is necessary to perform an adjustment of offset and sensitivity based on trimming of thin film resistor, a lot of time and cost are required for the adjustment of the offset and sensitivity.

c) Still further, in the control circuit formed by an analog amplifier, when it is used at high temperature, the analog amplifier produces an error caused by leakage current.

d) Still further, in a system taking the detecting signal from the acceleration sensor into a CPU, and executing the control of various parts and controlled device based on the detecting signal, it is necessary to convert the sensor signal to a digital value by using the A/D converter making it troublesome to design the system.

According to the present invention, as explained above, it is possible to easily resolve the above problems (a) to (d).

We claim:

1. A physical quantity detecting apparatus comprising:

a sensor element activated by a supply voltage and outputting an electric signal associated with a physical quantity applied to the sensor element;

an analog-to-digital (A/D), converter for digitizing the electric signal to obtain corresponding digital data;

control means for calculating a control amount based on the digital data in order to control the sensor element and reset the electric signal to a predetermined output by generating a PWM digital control signal in accordance with the control amount, wherein the control means outputs a detection value indicating said physical quantity; and activation means for activating the sensor element in accordance with the PWM digital control signal by outputting a PWM digital control voltage corresponding to the PWM digital control signal to the sensor element, said activation means being a digital circuit.

2. A physical quantity detecting apparatus as claimed in claim 1, wherein the A/D converter comprises:

a pulse rotating circuit having a plurality of inversion circuits ring-connected to each other for inverting an input signal and outputting an inverted signal, an inversion operating time being changed in accordance with a power voltages, one of the inversion circuits being formed as a start inversion circuit whose inverting operation is controllable from an external stage, and for rotating a pulse signal therein in response to a start operation of the start inversion circuit;

a counter connected to the pulse rotating circuit for counting the number of rotations of the pulse signal in the pulse rotating circuit, and outputting the result as binary digital data;

rotating position detecting means for detecting the rotating position of the pulse signal in the pulse rotating circuit based on an inverted signal from each inversion circuit, and generating the binary digital data in accordance with the rotating positions; and detecting controlling means for starting the start inversion circuit and starting rotational operation of the pulse rotating circuit, and for operating the rotating position detecting means at a time after a predetermined elapsed time;

wherein the A/D converter sets either the electric signal from the sensor element or another electrical signal changing in accordance with the electrical signal from the sensor element as the power voltage for the pulse rotating circuit and outputs digital data having plural bits containing lower bits and upper bits as the resultant data of the A/D conversion, the lower bits being the binary digital data from the rotating position and the upper bits being the binary digital data from the counter.

3. A physical quantity detecting apparatus, as claimed in claim 1 or 2, wherein the control means comprises:

comparing means for comparing the digital data with a predetermined reference data; and an up/down counter for increasing and decreasing the count value based on result of the comparing means, and outputting the count value as the control amount;

wherein the control means controls the power supply amount to the sensor element from the power supply means in accordance with the voltage based on the count value output by the up/down counter.

4. A physical quantity detecting apparatus, as claimed in claim 3, wherein the sensor element comprises:

a movable portion formed so as to be able to displace to a sensor element body;

a center electrode provided for any one of the movable portion or the sensor element body;

control electrodes provided on both sides of the center electrode and opposite to each other in the vicinity of the center electrode; and displacement detecting means for outputting the electric signal in accordance with the displacement of the movable portion, wherein the output of the displacement detecting means is input to the A/D converter, and the position of the movable portion is adjusted by a static electric force which occurs due to a supply voltage between the center electrode and each control electrode; and the activation means comprises:

center voltage supply means for supplying a potential, which corresponds to the count value of the up/down counter, to the center electrode; and control voltage supply means for controlling the potential of each control electrode in such a way that the poles of the center electrode are different from each other and the potential difference between the center electrode and each control electrode is increased or decreased periodically to the same value.

5. A physical quantity detecting apparatus as claimed in claim 1, wherein said sensor element comprises:

a moveable electrode which moves in response to a physical quantity applied to the sensor element;

a first fixed electrode which dose not move in response to the physical quantity applied to the sensor element and which is located near the moveable electrode; and a second fixed electrode which dose not move in response to the physical quantity applied to the sensor element and located opposite the first electrode; and wherein said activation means comprises:

a voltage supply means for supplying either a first potential or a second potential, the second potential being lower than the first potential, to the first and second fixed electrodes in accordance with a selection signal such that the first and second fixed electrodes receive different potential, the selection signal of the voltage supply means being the PWM digital control signal from the control means.

6. A physical amount detecting apparatus as claimed in claim 5, wherein said moveable electrode is connected to a predetermined power source, and resistor for source and the moveable electrode.

7. A physical quantity detecting apparatus as claimed in claim 5, wherein said voltage supply means contains first and second switches for supplying the first and second potentials to the first and second fixed control electrodes, and wherein the PWM digital control signal is a switching signal for selectively switching the first and second switches to connect the first and second switches to the first and second potentials.

8. A physical quantity detecting apparatus as claimed in claim 1, wherein the sensor element comprises first and second fixed control electrodes, wherein said activation means comprises a voltage supply means for supplying a first potential and a second potential lower than the first potential, to the first and second fixed control electrodes, and first and second fixed control electrodes, and first and second switches for supplying the first and second potential to the first and second fixed electrodes, and wherein the PWM digital control signal is a switching signal for selectively switching the first and second switches to connect the first and second switches to the first and second potentials.

9. A physical amount detecting apparatus as claimed in claim 1, wherein said oscillation means comprises a flip-flop circuit, and wherein a clock having a predetermined period is input to a set terminal of a flip-flop circuit, a signal based on the calculated control amount is input to a reset terminal of the flip-flop circuit, and the PWM digital control signal is generated in accordance with the clock signal having the predetermined period and the signal based on the calculated control amount.

10. A physical amount detecting apparatus as claimed in claim 1, wherein a first clock signal input to the A/D converter and the control means and a second clock signal input to the activation means have different clock periods, and an operation period of the A/D converter and the control means and an operation period for the activation means are different from each other.

11. A physical quantity detecting apparatus comprising:

a sensor element activated by a supply voltage and outputting an electric signal associated with a physical quantity applied to said sensor element;

an analog-to-digital (A/D) converter for digitizing the electric signal to obtain corresponding digital data;

control means for calculating a control amount in order to control the sensor element and reset the electric signal to a predetermined output by generating a control signal in accordance with the control amount, wherein the control means outputs a detection value indicating said physical quantity, the control means having:

an oscillator having a plurality of inversion circuits ring-connected to each other, one of the inversion circuits being formed as a start inversion circuit of which the inverting operation is controllable from an external stage, and for rotating the pulse signal, when the start inversion circuit is started by an input signal and outputting oscillation pulses at a predetermined time interval;

count means for counting an oscillation pulse from the oscillator and outputting the pulse signal when the count value reaches the previously set value;

a programmable delay line including a plurality of delay stages cascade-connected to each other, the plurality of delay stages comprising a basic path for passing the pulse signal from the count means, a delay path being formed by cascade-connecting a plurality of inversion circuits to each other and passing the pulse signal delayed by a predetermined delay time, and a selector for selecting either the basic path or the delay path as the path of the input signal in accordance with the digital data which are input from an external stage, wherein the programmable delay line outputs the delay signal which is delayed by a delay time less than the time interval of the oscillation time of the oscillator;

data control supplying means for receiving digital control data having predetermined bits indicating the delay time of the input signal, setting upper bits of the digital control data as count values of the count means, supplying lower bits of the digital control data to the programmable delay line, and setting the delay time of the programmable delay line; and output means for generating the input signal for a predetermined period to start the oscillator, stopping the oscillator when the delay signal is output from the programmable delay line, and generating a high level signal until the delay signal is output from the programmable delay line after the input signal is generated, wherein the control means further comprises a pulse width modulating circuit for setting the control amount to the digital control data and outputting the output signal having a pulse width in accordance with the control amount as the control signal, and controls the power supply time to the sensor element from the power supply means in accordance with a pulse width modulated signal which is output from the pulse width modulating circuit; and activation means for activating the sensor element in accordance with the control signal by outputting a digital PWM control voltage to the sensor element.

12. A physical quantity detecting apparatus as claimed in claims, wherein the sensor element comprises:

a movable portion formed so as to be able to displace a sensor element body;

a center electrode provided for any one of the movable portion or the sensor element body;

control electrodes provided on both sides of the center electrode and opposite to each other in the vicinity of the center electrode; and displacement detecting means for outputting the electric signal in accordance with the displacement of the movable portion, wherein the output of the displacement detecting means is input to the A/D converter, and the position of the movable portion is adjusted by a static electric force which occurs due to a supply voltage between the center electrode and each control electrode, and the activation means includes a pair of switches for supplying a predetermined drive voltage to two electrodes formed by the center electrode and each control electrode and alternately turned on/off in response to the pulse width modulated signal from the pulse width modulating circuit.

13. A physical quantity detecting apparatus as claimed in claim 12 or 4, wherein the displacement detecting means inputs the potential of the center electrode of the sensor element to the A/D converter as the electric signal indicating the movable portion.

14. A physical quantity detecting apparatus, as claimed in claim 12 or 4, wherein the displacement detecting means includes two metal-insulator-semiconductor (MIS)-type transistors, each of which is formed by a movable electrode for displacement detection, provided for the movable portion, and fixed electrodes for displacement detection provided on both sides of the movable electrode on the substrate and which are formed by an impurity diffusion layer, wherein the displacement of the movable portion is detected from a change in current flowing between the movable electrode and each fixed electrode.

15. A physical quantity detecting apparatus as claimed in claim 12, wherein the sensor element comprises first and second fixed control electrodes, wherein said activation means comprises a voltage supply means for supplying a first potential and a second potential lower than the first potential to the first and second fixed control electrodes, and first and second switches for supplying the first and second potential to the first and second fixed electrodes, and wherein the PWM digital control signal is a switching signal for selectively switching the first and second switches to connect the first and second switches to the first and second potentials.

16. A physical amount detecting apparatus as claimed in claim 11, wherein said oscillation means comprises a flip-flop circuit, and wherein a clock having a predetermined period is input to a set terminal of a flip-flop circuit, a signal based on the calculated control amount is input to a reset terminal of the flip-flop circuit, and the PWM digital control signal is generated in accordance with the clock signal having the predetermined period and the output from the programmable delay line.

17. A physical quantity detecting apparatus as claimed in claim 11, wherein the A/D converter comprises:

a pulse rotating circuit having a plurality of inversion circuits ring-connected to each other for inverting an input signal and outputting an inverted signal and for rotating a pulse signal therein in response to a start operation of the start inversion circuit, wherein an inversion operating time is changed in accordance with a power voltage and one of the inversion circuits is formed as a start inversion circuit whose inverting operation is controllable from an external stage, a counter connected to the pulse rotating circuit for counting the number of rotations of the pulse signal in the pulse rotating circuit and outputting the result as binary digital data;

rotating position detecting means for detecting the rotating position of the pulse signal in the pulse rotating circuit based on an inverted signal from each inversion circuit, and generating the binary digital data in accordance with the rotating positions; and detecting controlling means for starting the start inversion circuit and starting rotational operation of the pulse rotating circuit, and for operating the rotating position detecting means at a time after a predetermined elapsed time, wherein the A/D converter sets either the electric signal from the sensor element or another electrical signal changing in accordance with the electrical signal from the sensor element as the power voltage for the pulse rotating circuit and outputs digital data having plural bits, lower bits and upper bits as the resultant data of the A/D conversion, the lower bits being the binary digital data from the rotating position and the upper bits being the binary digital data from the counter.

18. A physical quantity detecting apparatus, comprising:

a sensor element activated by a supply voltage and outputting an electric signal associated with a physical quantity applied to said sensor element, said sensor element comprising:

a moveable electrode which moves based on a physical quantity applied to the sensor element;

a first fixed control electrode which does not move based on the physical quantity applied to the sensor element and which is located near the moveable electrode; and a second fixed control electrode which does not move based on the physical quantity applied to the sensor element and which is located opposite the first fixed control electrode;

an analog-to-digital (A/D) converter for digitizing the electric signal to obtain corresponding digital data;

control means for calculating a digital control amount in order to control the sensor element and reset the electric signal to a predetermined output by generating a PWM digital control signal in accordance with the digital control amount, wherein the control means also outputs a detection value indicating said physical quantity, wherein said control means includes an oscillation means for generating signals based on a period corresponding to a predetermined clock based on the calculated digital control amount, wherein the oscillation means directly converts the digital control amount into the PWM digital control signal; and activation means for activating the sensor element in accordance with the PWM digital control signal, wherein a different potential is alternately applied to the first and second fixed control electrodes from said activation means, the moveable electrode is connected to a predetermined power source, and a resistor for current limitation is connected between the predetermined power source and the moveable electrode.

19. An acceleration sensor comprising:

a sensor element activated by a supply voltage and outputting an electric signal associated with an acceleration force applied to said sensor element;

an analog-to-digital (A/D converter for digitizing the electric signal output from the sensor element to obtain corresponding digital data;

control means for receiving the digital data from the A/D converter, calculating a control amount to control the sensor element and reset the electric signal from the sensor element to a predetermined output by outputting the control signal in accordance with the control amount;

activation means for activating the sensor element in accordance with the control signal from the control means by outputting a PWM digital control voltage to the sensor element, the activation means being a digital circuit;

wherein the A/D converter comprises:

a pulse running circuit formed by a plurality of inversion circuits, each of which inverts an input signal and outputs an inverted signal and wherein an inverting time is changed by a power voltage, one of the inversion circuits being formed by a start inversion circuit whose inverting operation is controllable from an external stage, the pulse running circuit running a pulse signal in accordance with a start operation of the start inversion circuit; and running position detecting means for detecting a running position of the pulse signal within the pulse running circuit and outputting binary digital data in accordance with the running position, wherein the electric signal from the sensor element is used as the power voltage for each inversion circuit in the pulse running circuit, the binary digital data from the running position detecting means is output as the digital data, and the control amount or the control signal is output as a detecting signal indicating said acceleration.

20. An acceleration sensor comprising:

a sensor element activated by a supply voltage and outputting an electric signal associated with an acceleration force applied to said sensor element;

an analog-to-digital (A/D) converter for digitizing the electric signal output from the sensor element to obtain corresponding digital data;

control means for receiving the digital data from the A/D converter, calculating a control amount to control the sensor element and reset the electric signal from the sensor element to a predetermined output by outputting the control signal in accordance with the control amount;

activation means for activating the sensor element in accordance with the control signal from the control means by outputting a digital PWM control voltage to the sensor element, the activation means being a digital circuit;

wherein the A/D converter comprises:

a pulse running circuit formed by a plurality of inversion circuits, each of which inverts an input signal and outputs an inverted signal and wherein an inverting time is changed by a power voltage, one of the inversion circuits being formed by a start inversion circuit in which an inverting operation is controllable from an external stage, the pulse running circuit running a pulse signal in accordance with a start operation of the start inversion circuit;

running position detecting means for detecting a running position of the pulse signal within the pulse running circuit and outputting binary digital data in accordance with the running position; and detection controlling means for starting the start inversion circuit and inverting the operation of the pulse running circuit, and operating the running position detecting means after a predetermined time;

and wherein the electric signal from the sensor element is used as the power voltage for each inversion circuit in the pulse running circuit, the binary digital data from the running position detecting means is output as the digital data, and the control amount or the control signal is output as a detecting signal indicating said acceleration.

21. An acceleration sensor comprising:

a sensor element including an element having a first electrode, a second electrode having a predetermined gap for the first electrode which can be changed relatively in accordance with an acceleration force applied to the sensor element, a third electrode provided across the first electrode and opposite to the second electrode and having another gap for the first electrode which can be changed relatively in accordance with the applied acceleration, the sensor element outputting an electric signal associated with the acceleration;

an A/D converter for digitizing the electric signal from the sensor element to obtain a corresponding digital data;

control means for receiving the digital data from the A/D converter, calculating a control amount to control the sensor element and reset the electric signal from the element to a predetermined output, and outputting the control signal in accordance with the control amount;

pulse generating means for receiving the control amount from the control means, and outputting a control pulse signal having a pulse width corresponding to the control signal;

switch means for receiving the control pulse signal from the pulse generating means, and passing electric charges to or from the second electrode and the third electrode in accordance with a predetermined pattern and a pulse width of the control pulse signal;

wherein the A/D converter comprises:

a pulse rotating circuit formed by a plurality of inversion circuits, each of which inverts an input signal and outputs an inverted signal and wherein an inverting time is changed by a power voltage, one of the inversion circuits being formed by a start inversion circuit in which an inverting operation is controllable from an external stage, the pulse rotating circuit rotating a pulse signal in accordance with a start operation of the start inversion circuit;

a counter for counting the number of rotations of the pulse signal within the pulse rotating circuit, and outputting the result as binary digital data;

rotating position detecting means for detecting the rotating position of the pulse signal within the pulse rotating circuit based on the output signal from each inversion circuit in the pulse rotating circuit and outputting the binary digital data in accordance with the rotating position; and detecting controlling means for starting the start inversion circuit and inverting operation of the pulse rotating circuit, and operating the rotating position detecting means after a predetermined time, wherein the electric signal from the sensor element is used as the power voltage for each inversion circuit in the pulse running circuit, the binary digital data from the counter and the binary digital data from the rotating position detecting means are output as the digital data, and the control amount or the control signal is output as a detecting signal indicating acceleration.

22. A physical quantity detecting apparatus comprising:

a sensor element activated by a supply voltage and outputting an electric signal associated with a physical quantity, the sensor element having:

a moveable electrode which moves in response to a physical quantity applied to the sensor element;

a first fixed control electrode which does not move based on the physical quantity applied to the sensor element and which is located near the moveable electrode; and a second fixed control electrode which does not move based on the physical quantity applied to the sensor element and which is located opposite the first fixed control electrode;

an analog-to-digital (A/D) converter for digitizing the electric signal to obtain corresponding digital data;

control means for calculating a control amount based on the digital data in order to control the sensor element and reset the electric signal to a predetermined output by generating a control signal in accordance with the control amount, wherein the control means outputs a detection value indicating a physical value in accordance with the control amount or the control signal; and activation means for activating the sensor element in accordance with the control signal by alternately applying a differential potential to the first and second fixed control electrodes, wherein the moveable electrode is connected to a predetermined power source and a resistor is connected between the predetermined power source and the moveable electrode.

23. A physical quantity detecting apparatus, comprising:

a sensor element activated by a supply voltage and outputting an electric signal corresponding with a physical quantity applied to the sensor element;

an analog-to-digital (A/D) converter for digitizing the electric signal to obtain corresponding digital data;

control means for calculating a control amount based on the digital data in order to control the sensor element and reset the electric signal to a predetermined output by generating a PWM digital control signal in accordance with the control amount, wherein the control means outputs a detection value indicating said physical quantity and wherein the control means includes an oscillation means for generating signals based on a period in response to a predetermined clock, based on a calculated control amount; and activation means for activating the sensor element in accordance with the PWM digital control signal.

24. A physical quantity detecting apparatus as claimed in claim 23, wherein the calculated control amount itself is the digital data, and the oscillation means directly converts the control amount into the PWM digital control signal.

* * * * *